(12) United States Patent
Tams et al.

(10) Patent No.: US 7,184,978 B1
(45) Date of Patent: Feb. 27, 2007

(54) METHODS AND SYSTEMS FOR LEASING EQUIPMENT

(75) Inventors: Anton Tams, Ennis (IE); Gerard Moore, Castletroy View (IE); John Cunningham, Castletroy View (IE); Karen A. Amico, Greenwich, CT (US); James Justin Bradburn, Ridgefield, CT (US); Patrick Arthur Cosgrove, Stamford, CT (US)

(73) Assignee: GE Capital Aviation Services, Inc., Stamford, CT (US)

( * ) Notice: Subject to any disclaimer, the term of this patent is extended or adjusted under 35 U.S.C. 154(b) by 362 days.

(21) Appl. No.: 09/723,640

(22) Filed: Nov. 28, 2000

(51) Int. Cl.
*G06F 17/60* (2006.01)

(52) U.S. Cl. .............................. 705/35; 705/37; 705/27

(58) Field of Classification Search .................. 705/35, 705/26, 400, 27
See application file for complete search history.

(56) References Cited

U.S. PATENT DOCUMENTS

| | | | |
|---|---|---|---|
| 5,889,951 | A | 3/1999 | Lombardi |
| 6,226,746 | B1 | 5/2001 | Scheifler |
| 6,237,009 | B1 | 5/2001 | Waldo et al. |
| 6,249,217 | B1 | 6/2001 | Forbes |
| 6,263,350 | B1 | 7/2001 | Wollrath et al. |
| 6,711,548 | B1 * | 3/2004 | Rosenblatt ..................... 705/6 |
| 2001/0034690 | A1 * | 10/2001 | Joseph ......................... 705/37 |
| 2001/0034726 | A1 * | 10/2001 | McMahon et al. .......... 705/400 |
| 2002/0082860 | A1 * | 6/2002 | Johnson ........................ 705/1 |
| 2002/0100803 | A1 * | 8/2002 | Sehr ........................... 235/384 |
| 2002/0178080 | A1 * | 11/2002 | Ly et al. ...................... 705/26 |

* cited by examiner

*Primary Examiner*—Firmin Backer
(74) *Attorney, Agent, or Firm*—Armstrong Teasdale LLP

(57) ABSTRACT

Systems and methods that facilitate selection of particular equipment desired to be leased through contract execution are described herein. In one exemplary embodiment, the system includes a server having a database for storing data relating to an aircraft fleet. The stored data includes specific information relating to aircraft in the fleet, as well as terms of existing leases for those aircraft in the fleet then currently leased. The system is accessible to the customer via a network such as a wide area network, e.g., an extranet accessible via the Internet, so that the customer can query the database and identify aircraft the meets specific mission requirements. The system facilitates meeting customer requirements in that a customer can readily select, via the system, multiple aircraft desired for lease without requiring involvement of the marketing executive. Such selections can be made by the customer any time, anywhere, at the customers convenience. Once the customer submits the selections, the marketing executive then initiates and actually prepares the term sheets for the aircraft based on the actual customer selections and using terms acceptable to the customer.

58 Claims, 55 Drawing Sheets

LEASE EXTENSION

AIRWAYS  CURRENT FLEET

| AIRCRAFT SERIAL NUMBER | TYPE AND SERIES | CURRENT EXPIRY | NEW EXPIRY DATE | | | REQUEST EXTENSION TERM SHEET |
|---|---|---|---|---|---|---|
| △ 24.4 | B73 -40 | 16-NOV-2000 | 16▼ | NOV▼ | 2002▼ | ☑ |
| △ 23.8 | B73 -40 | 04-APR-2001 | 04▼ | APR▼ | 2002▼ | ☐ |
| △ 23.3 | B73 -30 | 16-MAY-2001 | 16▼ | MAY▼ | 2003▼ | ☐ |

[SUBMIT]

Sidebar:

HOME

REQUEST A PROPOSAL
SEEK ADDITIONAL AIRCRAFT
EXTEND EXISTING AIRCRAFT
SEEK SALE AND LEASE BACK

DEALS IN PROGRESS
A320 MSN 123 JUNE 2001
B737 MSN 5678 JULY 2002

REVIEW ACCOUNT STATUS
STATEMENT OF ACCOUNT
OVERDUE INTEREST CHARGES
VIEW INVOICE
RENT RESET REPORT

MAINTENANCE RESERVES
RESERVE BALANCES
SUBMIT MAINTENANCE CLAIM
MAINTENANCE BACKUP SHEETS
SUBMIT FOLLOW ON CLAIM
CLAIM GUIDELINES

RELATED SITES
ENGINE LEASING
FINANCE

EXTRANET SECURITY
DISCLAIMER
CHANGE YOUR PASSWORD

FIG. 7

| HOME |
|---|
| REQUEST A PROPOSAL |
| SEEK ADDITIONAL AIRCRAFT |
| EXTEND EXISTING AIRCRAFT |
| SEEK SALE AND LEASE BACK |
| DEALS IN PROGRESS |
| A320 MSN 123 JUNE 2001 |
| B737 MSN 5678 JULY 2002 |
| REVIEW ACCOUNT STATUS |
| STATEMENT OF ACCOUNT |
| OVERDUE INTEREST CHARGES |
| VIEW INVOICE |
| RENT RESET REPORT |
| MAINTENANCE RESERVES |
| RESERVE BALANCES |
| SUBMIT MAINTENANCE CLAIM |
| MAINTENANCE BACKUP SHEETS |
| SUBMIT FOLLOW ON CLAIM |
| CLAIM GUIDELINES |
| RELATED SITES |
| ENGINE LEASING |
| FINANCE |
| EXTRANET SECURITY |
| DISCLAIMER |
| CHANGE YOUR PASSWORD |

SEEK ADDITIONAL AIRCRAFT

△ DENOTES A REQUIRED FIELD

SPECIFY AIRCRAFT CRITERIA BELOW

△ AIRCRAFT TYPE [B73-30▽]  ⦿ NEW  ○ USED  ○ BOTH
△ ENGINE TYPE [F 56-A▽]
ENGINE THRUST [27000▽] LBS
CONFIGURATION [ ]F  [ ]B  [ ]Y
MTOW [75000▽] [LBS▽]
GALLEYS [ATLA▽]
YEAR OF MANUFACTURE [1994▽] TO [1999▽]

SPECIFY LEASE DELIVERY REQUIREMENTS

△ FIRST DELIVERY MONTH [JAN▽][2001▽] NO. OF AIRCRAFT [ ]
SECOND DELIVERY MONTH [JAN▽][2001▽] NO. OF AIRCRAFT [ ]
THIRD DELIVERY MONTH [JAN▽][2001▽] NO. OF AIRCRAFT [ ]

SPECIFY ADDITIONAL DATA FOR PROPOSAL (OPTIONAL)

LEASE TERM [12▽]
ANNUAL UTILISATION [3▽]
HOUR TO CYCLE RATIO [3:1▽]
REGISTRATION [SELECT A COUNTRY▽]

[SUBMIT]  [CLEAR]

FIG. 8

INQUIRY RESULTS

YOUR QUERY NUMBER IS BA001

SEARCH CRITERIA USED
AIRCRAFT TYPE & SERIES: B73-30    NEW    E I
ENGINE TYPE:            F56-5A    THRUST:    25,000
MTOW:                   75,498 Kg  GALLEY TYPE: ATLA
DOM:                    1985-1995  SEAT CONFIG: FO B 12 Y106

THE FOLLOWING AIRCRAFT ARE THE NEAREST MATCH TO YOUR SEARCH CRITERIA

B73-30  SERIAL 23  9    TECHNICAL SPECIFICATION    DELIVERY CONDITIONS ☑REQUEST TERM SHEET

| AIRCRAFT TYPE | ENGINE TYPE/THRUST | EFIS | MTOW | GALLEY TYPE | DOM | SEAT CONFIGURATION | AVAILABILITY |
|---|---|---|---|---|---|---|---|
| B73-30 | F 56-5A 25,000 LBS | NO | 70,000 Kg | ATLA | NEW | F O B0 Y108 | Q4 2000 |

B73-30  SERIAL 24  9    TECHNICAL SPECIFICATION    DELIVERY CONDITIONS ☐REQUEST TERM SHEET

| AIRCRAFT TYPE | ENGINE TYPE/THRUST | EFIS | MTOW | GALLEY TYPE | DOM | SEAT CONFIGURATION | AVAILABILITY |
|---|---|---|---|---|---|---|---|
| B73-30 USED | F 56-7B 25,000 | NO | 75,498 Kg | K SU | 1987 | F O B10 Y108 | Q4 2000 |

B737-300  SERIAL 29856    TECHNICAL SPECIFICATION    DELIVERY CONDITIONS ☐REQUEST TERM SHEET

| AIRCRAFT TYPE | ENGINE TYPE/THRUST | EFIS | MTOW | GALLEY TYPE | DOM | SEAT CONFIGURATION | AVAILABILITY |
|---|---|---|---|---|---|---|---|
| B73-30 USED | F 54-5A 25,000 | NO | 75,498 Kg | K SU | 1987 | FO B 2 Y106 | Q4 2001 |

[ SUBMIT REQUEST ]    [ CLOSE ]

HOME

REQUEST A PROPOSAL
SEEK ADDITIONAL AIRCRAFT
EXTEND EXISTING AIRCRAFT
SEEK SALE AND LEASE BACK

DEALS IN PROGRESS
A320 MSN 123 JUNE 2001
B737 MSN 5678 JULY 2002

REVIEW ACCOUNT STATUS
STATEMENT OF ACCOUNT
OVERDUE INTEREST CHARGES
VIEW INVOICE
RENT RESET REPORT

MAINTENANCE RESERVES
RESERVE BALANCES
SUBMIT MAINTENANCE CLAIM
MAINTENANCE BACKUP SHEETS
SUBMIT FOLLOW ON CLAIM
CLAIM GUIDELINES

RELATED SITES
ENGINE LEASING
FINANCE

EXTRANET SECURITY
DISCLAIMER
CHANGE YOUR PASSWORD

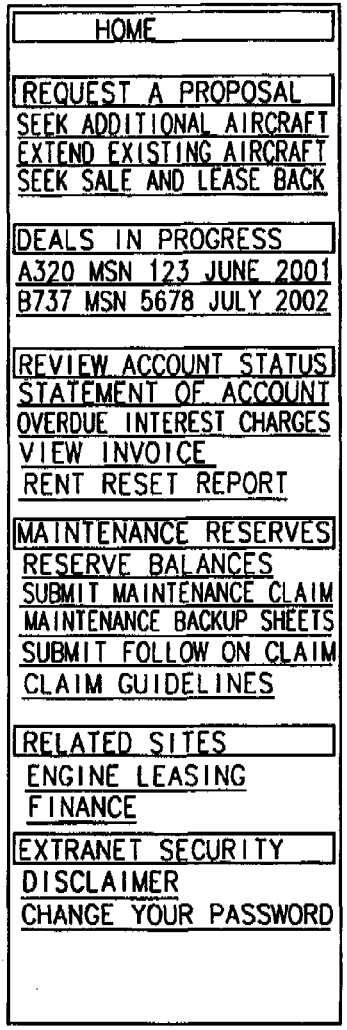

TECHNICAL SPECIFICATION

| | |
|---|---|
| AIRCRAFT TYPE | A3 -20 |
| DATE OF MANUFACTURE | 1-APR-1991 |
| MANUFACTURER | A BU INDUSTRIE |
| REGISTRATION NUMBER | C-G W |
| AIRCRAFT SERIAL NUMBER | 74 |
| FUSELAGE/LINE NUMBER | 74 |
| INTERIOR CONFIGURATION | F:0 |
| | B:24 |
| | Y:108 |
| CREW POSITIONS | COCKPIT: 2 OBSERVERS:2 |
| | CABIN:6 |
| EXTENDED OVERWATER CAPACITY | NONE |
| NOISE COMPLIANCE | III |
| APPROACH CATEGORY | IIIB |
| DISPLAY TYPE | EFI |

OPERATING WEIGHTS & FUEL CAPACITY

| | |
|---|---|
| MAXIMUM TAXI WEIGHT | 5,898.KILOGRAMS |
| MAXIMUM GROSS TAKEOFF WEIGHT | 5,498 KILOGRAMS |
| MAXIMUM LANDING WEIGHT | 4,500 KILOGRAMS |
| ZERO FUEL WEIGHT | 0,498 KILOGRAMS |
| BASIC EMPTY WEIGHT | 2,685 KILOGRAMS |
| FUEL CAPACITY | 3,856 LITRES |
| AIRFRAME AS OF | 7-JAN-2000 |
| TOTAL AIRFRAME HOURS | 31,525 |
| AIRFRAME AS OF | 7-JAN-2000 |
| TOTAL AIRFRAME HOURS | 31,525 |
| TOTAL AIRFRAME CYCLES | 11,112 |

FIG. 10

DELIVERY CONDITIONS

| DELIVERY CONDITIONS | |
|---|---|
| ENGINES: | 4,000 FLIGHT HOURS AND 3,000 CYCLES OF LIFE REMAINING TO THE NEXT SCHEDULED REMOVAL. |
| AIRFRAME: | EX BLOCK C CHECK IN ACCORDANCE WITH BOEING M |
| COMPONENTS: | AT LEAST 4,000 FLIGHT HOURS AND 3,000 CYCLES AND 12 MONTHS OF LIFE REAMINING, AS APPLICABLE, TO THE NEXT SCHEDULED REMOVAL IN ACCORDANCE WITH THE APPROVED MAINTENANCE PROGRAMME. |
| APU: | NOT MORE THAN 500 FLIGHT HOURS SINCE LAST GAS PATH REFURBISHMENT |
| LIVERY PAINTING: | TO BE PAINTED IN AN EXTERNAL LIVERY TO BE AGREED. |
| ETOPS: | IN COMPLIANCE WITH MANUFACTURERS RECOMMENDATIONS FOR 120 MINUTES ETOPS OPERATIONS. |
| EXPORT: | THE AIRCRAFT WILL HAVE A VALID EXPORT CERTIFICATE OF AIRWORTHINESS ISSUED BY THE IRISH AIR AUTHORITY. |

HOME

REQUEST A PROPOSAL
SEEK ADDITIONAL AIRCRAFT
EXTEND EXISTING AIRCRAFT
SEEK SALE AND LEASE BACK

DEALS IN PROGRESS
A320 MSN 123 JUNE 2001
B737 MSN 5678 JULY 2002

REVIEW ACCOUNT STATUS
STATEMENT OF ACCOUNT
OVERDUE INTEREST CHARGES
VIEW INVOICE
RENT RESET REPORT

MAINTENANCE RESERVES
RESERVE BALANCES
SUBMIT MAINTENANCE CLAIM
MAINTENANCE BACKUP SHEETS
SUBMIT FOLLOW ON CLAIM
CLAIM GUIDELINES

RELATED SITES
ENGINE LEASING
FINANCE

EXTRANET SECURITY
DISCLAIMER
CHANGE YOUR PASSWORD

| HOME |
|---|
| REQUEST A PROPOSAL |
| SEEK ADDITIONAL AIRCRAFT |
| EXTEND EXISTING AIRCRAFT |
| SEEK SALE AND LEASE BACK |
| DEALS IN PROGRESS |
| A320 MSN 123 JUNE 2001 |
| B737 MSN 5678 JULY 2002 |
| REVIEW ACCOUNT STATUS |
| STATEMENT OF ACCOUNT |
| OVERDUE INTEREST CHARGES |
| VIEW INVOICE |
| RENT RESET REPORT |
| MAINTENANCE RESERVES |
| RESERVE BALANCES |
| SUBMIT MAINTENANCE CLAIM |
| MAINTENANCE BACKUP SHEETS |
| SUBMIT FOLLOW ON CLAIM |
| CLAIM GUIDELINES |
| RELATED SITES |
| ENGINE LEASING |
| FINANCE |
| EXTRANET SECURITY |
| DISCLAIMER |
| CHANGE YOUR PASSWORD |

TECHNICAL REQUIREMENTS

⚠ DENOTES A REQUIRED FIELD

A320 MSN 123 JUNE 2001

|  | CURRENT | REQUIRED | |
|---|---|---|---|
| ⚠ CONFIGURATION | F B1 Y1 | [         ] | FIRST |
|  |  | [         ] | BUSINESS |
|  |  | [         ] | ECONOMY |
| ⚠ ENGINE THRUST | 25,000 LBS | [27000▼] | LBS |
| ⚠ MTOW | 75,498 Kg | [75000▼] | [LBS▼] |
| ⚠ GALLEYS | ATLA | [ATLA ▼] | |

LEASE REQUIREMENTS

| LEASE TERM | [12▼] | IN MONTHS |
|---|---|---|
| ANNUAL UTILISATION | [3▼] | NO. OF FLIGHT HRS. |
| HOUR TO CYCLE RATIO | [3:1▼] | |
| REGISTRATION | [SELECT A COUNTRY▼] | |

ADDITIONAL COMMENTS

[                                          ]

[SUBMIT]   [CLEAR]

FIG. 12

THANK YOU FOR REQUESTING A TERM SHEET

YOUR REQUEST WILL BE FORWARDED TO           . PLEASE CONFIRM YOUR CONTACT DETAILS, WHERE INCORRECT PLEASE MODIFY.

[     ] FIRST NAME     [ ] INITIAL     [     ] LAST NAME

[     ] E-MAIL ADDRESS

[     ] WORK PHONE

[ SUBMIT REQUEST ]

FOR INFORMATION AND QUERIES REGARDING AIRCRAFT AVAILABILITY PLEASE CONTACT US AT:

Side menu:
- [     ] HOME
- REQUEST A PROPOSAL
- SEEK ADDITIONAL AIRCRAFT
- EXTEND EXISTING AIRCRAFT
- SEEK SALE AND LEASE BACK
- [     ] DEALS IN PROGRESS
- A320 MSN 123 JUNE 2001
- B737 MSN 5678 JULY 2002
- [     ] REVIEW ACCOUNT STATUS
- STATEMENT OF ACCOUNT
- OVERDUE INTEREST CHARGES
- VIEW INVOICE
- RENT RESET REPORT
- [     ] MAINTENANCE RESERVES
- RESERVE BALANCES
- SUBMIT MAINTENANCE CLAIM
- MAINTENANCE BACKUP SHEETS
- SUBMIT FOLLOW ON CLAIM
- CLAIM GUIDELINES
- [     ] RELATED SITES
- ENGINE LEASING
- FINANCE
- [     ] EXTRANET SECURITY
- DISCLAIMER
- CHANGE YOUR PASSWORD

FIG. 13

PURCHASE/LEASE BACK

— NEW REQUEST/AMEND OLD REQUEST

REQUEST "PURCHASE/LEASE BACK"

NEW REQUEST & AMEND OLD REQUEST → ENTER AIRCRAFT TYPES → ENTER AIRCRAFT DETAILS → ENTER AIRCRAFT CONDITION → PROPOSE LEASE CONDITIONS → REQUEST TERM SHEET (RED INDICATES THE STEP YOU ARE AT, CLICK ON ANY ARROW TO GO TO ANOTHER STEP)

NEW REQUEST:

CLICK HERE TO SUBMIT NEW REQUEST

REVIEW REQUEST/AMEND AND RESUBMIT REQUEST:

SELECT THE TIME PERIOD YOU MADE THE REQUEST WITHIN OR THE REQUEST ID NUMBER

TIME PERIOD [ ▽ ]   REQUEST ID NUMBER [ ▽ ]

(HOLD DOWN THE CTRL KEY TO SELECT MORE THAN ONE ID NUMBER)

CLICK HERE TO REVIEW/AMEND OLD REQUESTS

Sidebar:

- HOME
- NEW BUSINESS
  - LEASE EXTENSION
  - ADDITIONAL REQUIREMENT
  - PURCHASE LEASE BACK
  - ENGINE EXTENSION
  - ENGINE REQUIREMENT
- DEAL STATUS
  - TRANSACTION NUMBER
  - 2000500
  - 2000600
  - 2000700
- LEASE MANAGEMENT
  - STATEMENT OF ACCOUNT
  - INTEREST CHARGES
  - RENT RESET REPORT
  - VIEW INVOICES
  - VIEW INVOICES (ASP VERSION)
- MAINTENANCE RESERVES
  - RESERVE/SUPPLEMENTAL RENT
  - CLAIM GUIDELINES
  - MRP BACKUP SHEETS
  - MRP BACKUP SHEETS (ASP VERSION)
- SUPPLEMENTAL RENT
  - SUBMIT NEW CLAIM
  - SUBMIT FOLLOW ON CLAIM
  - VIEW CLAIM STATUS

FIG. 15

PURCHASE/LEASE BACK

—NEW REQUEST/AMEND OLD REQUEST

REQUEST "PURCHASE/LEASE BACK"

[NEW REQUEST & AMEND OLD REQUEST] → [ENTER AIRCRAFT TYPES] → [ENTER AIRCRAFT DETAILS] → [ENTER AIRCRAFT CONDITION] → [PROPOSE LEASE CONDITIONS] → [REQUEST TERM SHEET]

(RED INDICATES THE STEP YOU ARE AT, CLICK ON ANY ARROW TO GO TO ANOTHER STEP)

SEARCH RESULTS:

| REQUEST ID NUMBER | ASSET TYPE(S) | DATE REQUEST SUBMITTED: | |
|---|---|---|---|
| | | | REVIEW/AMEND |
| | | | REVIEW/AMEND |
| | | | REVIEW/AMEND |
| | | | REVIEW/AMEND |
| | | | REVIEW/AMEND |

SEARCH PARAMETERS:
TO SEARCH AGAIN RESELECT THE TIME PERIOD OR REQUEST ID NUMBER AND CLICK ON "NEW SEARCH"

TIME PERIOD [▽]     REQUEST ID NUMBER [▽]

[NEW SEARCH]

---

Sidebar:
- HOME
- NEW BUSINESS
  - LEASE EXTENSION
  - ADDITIONAL REQUIREMENT
  - PURCHASE LEASE BACK
  - ENGINE EXTENSION
  - ENGINE REQUIREMENT
- DEAL STATUS
  - TRANSACTION NUMBER
  - 2000500
  - 2000600
  - 2000700
- LEASE MANAGEMENT
  - STATEMENT OF ACCOUNT
  - INTEREST CHARGES
  - RENT RESET REPORT
  - VIEW INVOICES
  - VIEW INVOICES (ASP VERSION)
  - MAINTENANCE RESERVES
  - RESERVE/ SUPPLEMENTAL RENT
  - CLAIM GUIDELINES
  - MRP BACKUP SHEETS
  - MRP BACKUP SHEETS (ASP VERSION)
- SUPPLEMENTAL RENT
  - SUBMIT NEW CLAIM
  - SUBMIT FOLLOW ON CLAIM
  - VIEW CLAIM STATUS

FIG. 16

PURCHASE/LEASE BACK

SAVE REQUEST DATA — CLICK HERE TO COMPLETE THIS REQUEST AT ANOTHER TIME. YOU WILL BE GIVEN AN ID NUMBER WHICH YOU CAN USE TO RETRIEVE YOUR DATA

-ENTER AIRCRAFT TYPES

REQUEST "PURCHASE/LEASE BACK"

[NEW REQUEST & AMEND OLD REQUEST] → [ENTER AIRCRAFT TYPES] → [ENTER AIRCRAFT DETAILS] → [ENTER AIRCRAFT CONDITION] → [PROPOSE LEASE CONDITIONS] → [REQUEST TERM SHEET]

(RED INDICATES THE STEP YOU ARE AT, CLICK ON ANY ARROW TO GO TO ANOTHER STEP)

△ DENOTES A REQUIRED FIELD

PLEASE SELECT TYPE, VARIANT AND NUMBERS OF UNITS FOR PURCHASE/LEASEBACK.
USE MULTIPLE ROWS IF MORE THAN ONE AIRCRAFT AND VARIANT.

△ AIRCRAFT TYPE: [ ▽ ]  △ AIRCRAFT VARIANT: [ ▽ ]  △ NUMBER: [ ]
△ AIRCRAFT TYPE: [ ▽ ]  △ AIRCRAFT VARIANT: [ ▽ ]  △ NUMBER: [ ]
△ AIRCRAFT TYPE: [ ▽ ]  △ AIRCRAFT VARIANT: [ ▽ ]  △ NUMBER: [ ]
△ AIRCRAFT TYPE: [ ▽ ]  △ AIRCRAFT VARIANT: [ ▽ ]  △ NUMBER: [ ]
△ AIRCRAFT TYPE: [ ▽ ]  △ AIRCRAFT VARIANT: [ ▽ ]  △ NUMBER: [ ]

[SUBMIT]

Sidebar

- HOME
- NEW BUSINESS
  - LEASE EXTENSION
  - ADDITIONAL REQUIREMENT
  - PURCHASE LEASE BACK
  - ENGINE EXTENSION
  - ENGINE REQUIREMENT
- DEAL STATUS
  - TRANSACTION NUMBER
    - 20000500
    - 20000600
    - 20000700
- LEASE MANAGEMENT
  - STATEMENT OF ACCOUNT
  - INTEREST CHARGES
  - RENT RESET REPORT
  - VIEW INVOICES
  - VIEW INVOICES (ASP VERSION)
- MAINTENANCE RESERVES
  - RESERVE/SUPPLEMENTAL RENT
  - CLAIM GUIDELINES
  - MRP BACKUP SHEETS
  - MRP BACKUP SHEETS (ASP VERSION)
  - SUPPLEMENTAL RENT
  - SUBMIT NEW CLAIM
  - SUBMIT FOLLOW ON CLAIM
  - VIEW CLAIM STATUS

FIG. 17

PURCHASE/LEASE BACK

| HOME |
|---|
| NEW BUSINESS |
| LEASE EXTENSION |
| ADDITIONAL REQUIREMENT |
| PURCHASE LEASE BACK |
| ENGINE EXTENSION |
| ENGINE REQUIREMENT |
| DEAL STATUS |
| TRANSACTION NUMBER |
| 20000500 |
| 20000600 |
| 20000700 |
| LEASE MANAGEMENT |
| STATEMENT OF ACCOUNT |
| INTEREST CHARGES |
| RENT RESET REPORT |
| VIEW INVOICES |
| VIEW INVOICES (ASP VERSION) |
| MAINTENANCE RESERVES |
| RESERVE/SUPPLEMENTAL RENT |
| CLAIM GUIDELINES |
| MRP BACKUP SHEETS |
| MRP BACKUP SHEETS (ASP VERSION) |
| SUPPLEMENTAL RENT |
| SUBMIT NEW CLAIM |
| SUBMIT FOLLOW ON CLAIM |
| VIEW CLAIM STATUS |

SAVE REQUEST DATA — CLICK HERE TO COMPLETE THIS REQUEST AT ANOTHER TIME. YOU WILL BE GIVEN AN ID NUMBER WHICH YOU CAN USE TO RETRIEVE YOUR DATA

— ENTER AIRCRAFT DETAILS

REQUEST "PURCHASE/LEASE BACK"

[NEW REQUEST & AMEND OLD REQUEST] → [ENTER AIRCRAFT TYPES] → [ENTER AIRCRAFT DETAILS] → [ENTER AIRCRAFT CONDITION] → [PROPOSE LEASE CONDITIONS] → [REQUEST TERM SHEET]

(RED INDICATES THE STEP YOU ARE AT, CLICK ON ANY ARROW TO GO TO ANOTHER STEP)

△ DENOTES A REQUIRED FIELD

AIRCRAFT DETAILS:

| | AIRCRAFT 1 | AIRCRAFT 2 | AIRCRAFT 3 | AIRCRAFT 4 |
|---|---|---|---|---|
| △ AIRCRAFT TYPE: | ▽ | ▽ | ▽ | ▽ |
| △ AIRCRAFT MODEL: | ▽ | ▽ | ▽ | ▽ |
| △ YEAR OF MANUFACTURE: | | | | |
| △ AIRCRAFT SERIAL NUMBER: | | | | |
| △ AIRCRAFT REG NUMBER: | | | | |
| △ ENGINE TYPE: | ▽ | ▽ | ▽ | ▽ |
| △ ENGINE MODEL: | ▽ | ▽ | ▽ | ▽ |
| △ ENGINE THRUST:(LBS) | | | | |
| △ MTOW | ○ LBS ○ KGS | ○ LBS ○ KGS | ○ LBS ○ KGS | ○ LBS ○ KGS |
| △ ZERO FUEL WEIGHT | | | | |

PURCHASE/LEASE BACK

| HOME |
|---|
| NEW BUSINESS |

LEASE EXTENSION
ADDITIONAL REQUIREMENT
PURCHASE LEASE BACK
ENGINE EXTENSION
ENGINE REQUIREMENT

| DEAL STATUS |
|---|

TRANSACTION NUMBER
20000500
20000600
20000700

| LEASE MANAGEMENT |
|---|

STATEMENT OF ACCOUNT
INTEREST CHARGES
RENT RESET REPORT
VIEW INVOICES
VIEW INVOICES
(ASP VERSION)

| MAINTENANCE RESERVES |
|---|

RESERVE/
SUPPLEMENTAL RENT
CLAIM GUIDELINES
MRP BACKUP SHEETS
MRP BACKUP SHEETS
(ASP VERSION)

| SUPPLEMENTAL RENT |
|---|

SUBMIT NEW CLAIM
SUBMIT FOLLOW ON CLAIM
VIEW CLAIM STATUS

---

| SAVE REQUEST DATA | CLICK HERE TO COMPLETE THIS REQUEST AT ANOTHER TIME. YOU WILL BE GIVEN AN ID NUMBER WHICH YOU CAN USE TO RETRIEVE YOUR DATA |

-ENTER AIRCRAFT CONDITIONS

REQUEST "PURCHASE/LEASE BACK"

NEW REQUEST & AMEND OLD REQUEST → ENTER AIRCRAFT TYPES → ENTER AIRCRAFT DETAILS → ENTER AIRCRAFT CONDITION → PROPOSE LEASE CONDITIONS → REQUEST TERM SHEET (RED INDICATES THE STEP YOU ARE AT, CLICK ON ANY ARROW TO GO TO ANOTHER STEP)

△ DENOTES A REQUIRED FIELD

|  | AIRCRAFT 1 | AIRCRAFT 2 | AIRCRAFT 3 | AIRCRAFT 4 |
|---|---|---|---|---|
| AIRCRAFT DATA: | | | | |
| AIRCRAFT TYPE: | | | | |
| AIRCRAFT MODEL: | | | | |
| YEAR OF MANUFACTURE: | | | | |
| AIRCRAFT SERIAL NUMBER: | | | | |
| AIRCRAFT CONDITIONS: AS OF DATE △ | | | | |
| AIRFRAME/LANDING GEAR/APU | | | | |
| △ TOTAL HOURS SINCE NEW? | | | | |
| △ TOTAL CYCLES SINCE NEW? | | | | |

PLEASE ATTACH THE FOLLOWING DOCUMENT. YOU CAN EITHER DRAG THESE DOCUMENTS FROM YOUR DESKTOP OR MICROSOFT FILE MANAGER OR USE THE 'ATTACH FILE' BUTTON TO LOCATE DOCUMENTS ON YOUR SYSTEM. IF YOU ARE UNABLE TO ATTACH ANY OF THESE DOCUMENTS PLEASE EITHER:

| | | | | |
|---|---|---|---|---|
| ▲ AIRFRAME AND LANDING GEAR MAINTENANCE STATUS (INCLUDING HOURS AND CYCLES) | ◉ ATTACHED<br>○ EMAIL/FAX /POST | ◉ ATTACHED<br>○ EMAIL/FAX /POST | ◉ ATTACHED<br>○ EMAIL/FAX /POST | ◉ ATTACHED<br>○ EMAIL/FAX /POST |
| ▲ LAYOUT OF CABIN ARRANGEMENT (INCLUDE BASIC GALLEY DRAWINGS IF POSSIBLE. IF IFE INSTALLED GIVE DETAILS) | ◉ ATTACHED<br>○ EMAIL/FAX /POST | ◉ ATTACHED<br>○ EMAIL/FAX /POST | ◉ ATTACHED<br>○ EMAIL/FAX /POST | ◉ ATTACHED<br>○ EMAIL/FAX /POST |
| ▲ APU MAINTENANCE STATUS | ◉ ATTACHED<br>○ EMAIL/FAX /POST | ◉ ATTACHED<br>○ EMAIL/FAX /POST | ◉ ATTACHED<br>○ EMAIL/FAX /POST | ◉ ATTACHED<br>○ EMAIL/FAX /POST |
| ▲ ENGINES: | ENTER ENGINE CONDITIONS | ENTER ENGINE CONDITIONS | ENTER ENGINE CONDITIONS | ENTER ENGINE CONDITIONS |

COMMENTS?

[ SUBMIT AND GO TO LEASE CONDITIONS ]

| | | | | ATTACH FILES |
|---|---|---|---|---|

| SUPPLEMENTAL RENT |
|---|
| SUBMIT NEW CLAIM |
| SUBMIT FOLLOW ON CLAIM |
| VIEW CLAIM STATUS |
| EXTRANET SECURITY |
| DISCLAIMER |
| CHANGE YOUR PASSWORD |

▲ ENGINE RECORDS | ATTACH FILES | ATTACH FILES | ATTACH FILES | ATTACH FILES

HAVE YOU INCLUDED THE FOLLOWING OR WILL YOU EMAIL/FAX/POST?:

| | | | | |
|---|---|---|---|---|
| LAST SHOP VISIT (OR EQUIVALENT WITH WORK SCOPE APPLIED) | ◉ ATTACHED<br>○ EMAIL/FAX /POST | ◉ ATTACHED<br>○ EMAIL/FAX /POST | ◉ ATTACHED<br>○ EMAIL/FAX /POST | ◉ ATTACHED<br>○ EMAIL/FAX /POST |
| LLP SHEET OR BACK TO BIRTH STATEMENT/LLP | ◉ ATTACHED<br>○ EMAIL/FAX /POST | ◉ ATTACHED<br>○ EMAIL/FAX /POST | ◉ ATTACHED<br>○ EMAIL/FAX /POST | ◉ ATTACHED<br>○ EMAIL/FAX /POST |
| TEST LOG | ◉ ATTACHED<br>○ EMAIL/FAX /POST | ◉ ATTACHED<br>○ EMAIL/FAX /POST | ◉ ATTACHED<br>○ EMAIL/FAX /POST | ◉ ATTACHED<br>○ EMAIL/FAX /POST |
| AD STATUS | ◉ ATTACHED<br>○ EMAIL/FAX /POST | ◉ ATTACHED<br>○ EMAIL/FAX /POST | ◉ ATTACHED<br>○ EMAIL/FAX /POST | ◉ ATTACHED<br>○ EMAIL/FAX /POST |

FIG. 24

△ ENGINE RECORDS

HAVE YOU INCLUDED THE FOLLOWING OR WILL YOU EMAIL/FAX/POST?:

|  | ATTACH FILES | ATTACH FILES | ATTACH FILES | ATTACH FILES |
|---|---|---|---|---|
| LAST SHOP VISIT (OR EQUIVALENT WITH WORK SCOPE APPLIED) | ◉ ATTACHED<br>○ EMAIL/FAX /POST | ◉ ATTACHED<br>○ EMAIL/FAX /POST | ◉ ATTACHED<br>○ EMAIL/FAX /POST | ◉ ATTACHED<br>○ EMAIL/FAX /POST |
| LLP SHEET OR BACK TO BIRTH STATEMENT/LLP | ◉ ATTACHED<br>○ EMAIL/FAX /POST | ◉ ATTACHED<br>○ EMAIL/FAX /POST | ◉ ATTACHED<br>○ EMAIL/FAX /POST | ◉ ATTACHED<br>○ EMAIL/FAX /POST |
| TEST LOG | ◉ ATTACHED<br>○ EMAIL/FAX /POST | ◉ ATTACHED<br>○ EMAIL/FAX /POST | ◉ ATTACHED<br>○ EMAIL/FAX /POST | ◉ ATTACHED<br>○ EMAIL/FAX /POST |
| AD STATUS | ◉ ATTACHED<br>○ EMAIL/FAX /POST | ◉ ATTACHED<br>○ EMAIL/FAX /POST | ◉ ATTACHED<br>○ EMAIL/FAX /POST | ◉ ATTACHED<br>○ EMAIL/FAX /POST |

COMMENTS?

SUBMIT AND RETURN TO AIRCRAFT CONDITIONS

CHANGE YOUR PASSWORD

FIG. 25

PURCHASE/LEASE BACK

[SAVE REQUEST DATA]  CLICK HERE TO COMPLETE THIS REQUEST AT ANOTHER TIME. YOU WILL BE GIVEN AN ID NUMBER WHICH YOU CAN USE TO RETRIEVE YOUR DATA

—PROPOSE LEASE CONDITIONS/REQUEST TERM SHEET

REQUEST "PURCHASE/LEASE BACK"

[NEW REQUEST & AMEND OLD REQUEST] → [ENTER AIRCRAFT TYPES] → [ENTER AIRCRAFT DETAILS] → [ENTER AIRCRAFT CONDITION] → [PROPOSE LEASE CONDITIONS] → [REQUEST TERM SHEET]

(RED INDICATES THE STEP YOU ARE AT, CLICK ON ANY ARROW TO GO TO ANOTHER STEP)

△ DENOTES A REQUIRED FIELD

| | AIRCRAFT 1 | AIRCRAFT 2 | AIRCRAFT 3 | AIRCRAFT 4 |
|---|---|---|---|---|
| AIRCRAFT DATA: | | | | |
| AIRCRAFT TYPE: | | | | |
| AIRCRAFT MODEL: | | | | |
| YEAR OF MANUFACTURE: | | | | |
| AIRCRAFT SERIAL NUMBER: | | | | |

PROPOSED LEASE CONDITIONS:
△ REQUIRED BID BY:
△ PURCHASE/LEASE START DATE:
△ LEASE TERM (MONTHS):

Sidebar:

- HOME
- NEW BUSINESS
  - LEASE EXTENSION
  - ADDITIONAL REQUIREMENT
  - PURCHASE LEASE BACK
  - ENGINE EXTENSION
  - ENGINE REQUIREMENT
- DEAL STATUS
  - TRANSACTION NUMBER
  - 2000500
  - 2000600
  - 2000700
- LEASE MANAGEMENT
  - STATEMENT OF ACCOUNT
  - INTEREST CHARGES
  - RENT RESET REPORT
  - VIEW INVOICES
  - VIEW INVOICES (ASP VERSION)
- MAINTENANCE RESERVES
  - RESERVE/SUPPLEMENTAL RENT
  - CLAIM GUIDELINES
  - MRP BACKUP SHEETS
  - MRP BACKUP SHEETS (ASP VERSION)
- SUPPLEMENTAL RENT
  - SUBMIT NEW CLAIM
  - SUBMIT FOLLOW ON CLAIM
  - VIEW CLAIM STATUS

PROPOSED LEASE CONDITIONS:
△ PURCHASE/LEASE START DATE:
△ LEASE TERM (MONTHS):
△ PROPOSED PURCHASE PRICE FOR AIRCRAFT:
△ PROPOSED MONTHLY RENTAL FOR LEASEBACK:

OPTIONS:
EXTENSIONS ☐ ☐ ☐
EARLY TERMINATION ☐ ☐ ☐
REPURCHASE OPTION ☐ ☐ ☐

COMMENTS?

LESSEE FINANCIALS:
(REVENUE, OP INCOME, TOTAL LIABILITIES, EQUITY, TOTAL ASSETS, MARKET SECURITIES, BANK LINES AVAILABLE, AVAILABLE CASH)

DRAG FILES FROM YOUR DESKTOP OR FILE MANAGER OR USE 'ATTACH FILES' BUTTON OPPOSITE

ATTACH FILES

MAINTENANCE RESERVES
RESERVE/
SUPPLEMENTAL RENT
CLAIM GUIDELINES
MRP BACKUP SHEETS
MRP BACKUP SHEETS
(ASP VERSION)
SUPPLEMENTAL RENT
SUBMIT NEW CLAIM
SUBMIT FOLLOW ON CLAIM
VIEW CLAIM STATUS
EXTRANET SECURITY
DISCLAIMER
CHANGE YOUR PASSWORD

OPTIONS:

EXTENSIONS ☐ ☐ ☐

EARLY TERMINATION ☐ ☐ ☐

REPURCHASE OPTION ☐ ☐ ☐

COMMENTS?

LESSEE FINANCIALS:
(REVENUE, OP INCOME, TOTAL LIABILITIES, EQUITY, TOTAL ASSETS, MARKET SECURITIES, BANK LINES AVAILABLE, AVAILABLE CASH)

DRAG FILES FROM YOUR DESKTOP OR FILE MANAGER OR USE 'ATTACH FILES' BUTTON OPPOSITE

[ATTACH FILES]

FLEET INFORMATION:

DRAG FILES FROM YOUR DESKTOP OR FILE MANAGER OR USE THE 'ATTACH FILES' BUTTON OPPOSITE

[ATTACH FILES]

[REQUEST TERMSHEET]

FIG. 28

PURCHASE/LEASE BACK

-REQUEST TERMSHEET

REQUEST "PURCHASE/LEASE BACK"

[NEW REQUEST & AMEND OLD REQUEST] → [ENTER AIRCRAFT TYPES] → [ENTER AIRCRAFT DETAILS] → [ENTER AIRCRAFT CONDITION] → [PROPOSE LEASE CONDITIONS] → [REQUEST TERM SHEET]

(RED INDICATES THE STEP YOU ARE AT. CLICK ON ANY ARROW TO GO TO ANOTHER STEP)

THANK YOU FOR REQUESTING A TERM SHEET

IF FOLLOW DOCS ARE REQUIRED THIS MESSAGE IS DISPLAYED:
TRANSACTION NUMBER [xxxxxxxxxx] HAS BEEN ASSIGNED TO YOUR REQUEST
YOU HAVE INDICATED THAT YOU WILL EMAIL/FAX/POST THE FOLLOWING DOCUMENTATION:
1.
2.
3.
4.
5.

ONCE WE RECEIVE THIS DOCUMENTATION WE CAN COMPLETE PROCESSING YOUR REQUEST. YOU WILL RECEIVE A CONFIRMATIONAL EMAIL CONFIRMING THE DOCUMENTATION YOU WILL BE SENDING AND YOUR REQUEST ID NUMBER.

IF ALL DOCUMENTATION HAS BEEN PROVIDED THIS MESSAGE IS DISPLAYED:
TRANSACTION NUMBER [xxxxxxxxxx] HAS BEEN ASSIGNED TO YOUR REQUEST
YOU WILL RECEIVE A CONFIRMATIONAL EMAIL CONFIRMING YOUR REQUEST ID NUMBER
YOUR REQUEST WILL BE FORWARDED TO YOUR MARKETING REPRESENTATIVE AT
PLEASE CONFIRM YOUR CONTACT DETAILS

---

HOME

NEW BUSINESS
LEASE EXTENSION
ADDITIONAL REQUIREMENT
PURCHASE LEASE BACK
ENGINE EXTENSION
ENGINE REQUIREMENT

/DEAL STATUS
TRANSACTION NUMBER
2000500
2000600
2000700

LEASE MANAGEMENT
STATEMENT OF ACCOUNT
INTEREST CHARGES
RENT RESET REPORT
VIEW INVOICES
VIEW INVOICES (ASP VERSION)

MAINTENANCE RESERVES
RESERVE/SUPPLEMENTAL RENT
CLAIM GUIDELINES
MRP BACKUP SHEETS
MRP BACKUP SHEETS (ASP VERSION)

SUPPLEMENTAL RENT
SUBMIT NEW CLAIM
SUBMIT FOLLOW ON CLAIM
VIEW CLAIM STATUS

FIG. 29

YOU WILL RECEIVE A CONFIRMATIONAL EMAIL CONFIRMING YOUR REQUEST ID NUMBER
YOUR REQUEST WILL BE FORWARDED TO YOUR MARKETING REPRESENTATIVE AT
PLEASE CONFIRM YOUR COTACT DETAILS

CONFIRM ADDRESS

FIRST NAME:    INITIAL:    LAST NAME:

ADDRESS1:

ADDRESS2(OPTIONAL):

CITY:    STATE/PROVINCE (OPTIONAL):    ZIP/POSTAL CODE:

COUNTRY:

WORK TELEPHONE NUMBER:    FAX NUMBER(OPTIONAL):

EMAIL ADDRESS:

EDIT CONTACT DETAILS

SUBMIT REQUEST

FIG. 30

SUBMIT NEW CLAIM
SUBMIT FOLLOW ON CLAIM
VIEW CLAIM STATUS
EXTRANET SECURITY
DISCLAIMER
CHANGE YOUR PASSWORD

PURCHASE/LEASE BACK

-REQUEST TERMSHEET

REQUEST "PURCHASE/LEASE BACK"

- NEW REQUEST & AMEND OLD REQUEST
- ENTER AIRCRAFT TYPES
- ENTER AIRCRAFT DETAILS
- ENTER AIRCRAFT CONDITION
- PROPOSE LEASE CONDITIONS
- REQUEST TERM SHEET (RED INDICATES THE STEP YOU ARE AT, CLICK ON ANY ARROW TO GO TO ANOTHER STEP)

EDIT ADDRESS

FIRST NAME: ___  INITIAL: ___  LAST NAME: ___

ADDRESS1: ___

ADDRESS2(OPTIONAL): ___

CITY: ___  STATE/PROVINCE (OPTIONAL): ___  ZIP/POSTAL CODE: ___

COUNTRY: ___

WORK TELEPHONE NUMBER: ___  FAX NUMBER(OPTIONAL): ___

- HOME
- NEW BUSINESS
  - LEASE EXTENSION
  - ADDITIONAL REQUIREMENT
  - PURCHASE LEASE BACK
  - ENGINE EXTENSION
  - ENGINE REQUIREMENT
- DEAL STATUS
  - TRANSACTION NUMBER
    - 2000500
    - 2000600
    - 2000700
- LEASE MANAGEMENT
  - STATEMENT OF ACCOUNT
  - INTEREST CHARGES
  - RENT RESET REPORT
  - VIEW INVOICES
  - VIEW INVOICES (ASP VERSION)
- MAINTENANCE RESERVES
  - RESERVE/SUPPLEMENTAL RENT
  - CLAIM GUIDELINES
  - MRP BACKUP SHEETS
  - MRP BACKUP SHEETS (ASP VERSION)
- SUPPLEMENTAL RENT
  - SUBMIT NEW CLAIM
  - SUBMIT FOLLOW ON CLAIM
  - VIEW CLAIM STATUS

FIG. 32

REQUEST "PURCHASE/LEASE BACK"

| NEW REQUEST & AMEND OLD REQUEST | ENTER AIRCRAFT TYPES | ENTER AIRCRAFT DETAILS | ENTER AIRCRAFT CONDITION | PROPOSE LEASE CONDITIONS | REQUEST TERM SHEET |

(RED INDICATES THE STEP YOU ARE AT, CLICK ON ANY ARROW TO GO TO ANOTHER STEP)

EDIT ADDRESS

FIRST NAME:    INITIAL:    LAST NAME:

ADDRESS1:

ADDRESS2(OPTIONAL):

CITY:    STATE/PROVINCE (OPTIONAL):    ZIP/POSTAL CODE:

COUNTRY:

WORK TELEPHONE NUMBER:    FAX NUMBER(OPTIONAL):

EMAIL ADDRESS:

SUBMIT CONTACT DETAILS

---

PURCHASE LEASE BACK
ENGINE EXTENSION
ENGINE REQUIREMENT

DEAL STATUS
TRANSACTION NUMBER
2000500
2000600
2000700

LEASE MANAGEMENT
STATEMENT OF ACCOUNT
INTEREST CHARGES
RENT RESET REPORT
VIEW INVOICES
VIEW INVOICES (ASP VERSION)

MAINTENANCE RESERVES
RESERVE/SUPPLEMENTAL RENT
CLAIM GUIDELINES
MRP BACKUP SHEETS
MRP BACKUP SHEETS (ASP VERSION)

SUPPLEMENTAL RENT
SUBMIT NEW CLAIM
SUBMIT FOLLOW ON CLAIM
VIEW CLAIM STATUS

EXTRANET SECURITY
DISCLAIMER
CHANGE YOUR PASSWORD

CUSTOMER VIEW

AVAILABILITY QUERIES
CUSTOMER VIEW
FULL SEARCH
MANAGE CUSTOMER

DOCUMENTATION GENERATION
GENERATE NEW LOI
REVISE/COMPLETE EXISTING LOI
GENERATE NEW ASLA
REVISE/COMPLETE EXISTING ASLA

LEASE MANAGEMENT
VIEW CUSTOMER ACCOUNT
VIEW CUSTOMERS MRF BALANCES
VIEW MRF CLAIM STATUS

SELECT CUSTOMER [ AIRWAYS ▽ ]

VIEW QUERY FOR [ LAST 1 WEEK ▽ ]

CUSTOMER VIEW

AVAILABILITY QUERIES
CUSTOMER VIEW
FULL SEARCH
MANAGE CUSTOMER
DOCUMENTATION GENERATION
GENERATE LOI
GENERATE ASLA
LEASE MANAGEMENT
VIEW CUSTOMER ACCOUNT
VIEW CUSTOMERS MRF BALANCES
VIEW MRF CLAIM STATUS

SELECT CUSTOMER [AIRWAYS ▽]
VIEW QUERY FOR [LAST 1 WEEK ▽]
(GO)

PREVIOUS SEARCHES MADE BY AIRWAYS

| QUERY NUMBER | AIRCRAFT TYPE | ENGINE TYPE/THRUST | EFIS/NON EFIS | LEASE TERM | QUERY DATE |
|---|---|---|---|---|---|
| BA001 | B73-60 | F 56-7B | EFIS | 60 MONTHS | 23/04/2000 |
| BA002 | B73-60 | F 56-7B | EFIS | 48 MONTHS | 30/03/2000 |
| BA003 | B73-60 | F 56-7B | EFIS | 60 MONTHS | 23/02/2000 |
| BA004 | M 8 | F 56-7B | EFIS | 60 MONTHS | 23/01/2000 |

F I G . 34

FULL SEARCH

▲ DENOTES A REQUIRED FIELD

AVAILABILITY QUERIES
CUSTOMER VIEW
FULL SEARCH
MANAGE CUSTOMER

DOCUMENTATION GENERATION
GENERATE NEW LOI
REVISE/COMPLETE EXISTING LOI
GENERATE NEW ASLA
REVISE/COMPLETE EXISTING ASLA

LEASE MANAGEMENT
VIEW CUSTOMER ACCOUNT
VIEW CUSTOMERS MRF BALANCES
VIEW MRF CLAIM STATUS

SPECIFY AIRCRAFT CRITERIA BELOW

▲ AIRCRAFT TYPE [B73-30 ▽]   ⊙ NEW  ○ USED  ○ BOTH
▲ ENGINE TYPE [F56-A ▽]
ENGINE THRUST [27000 ▽] LBS
CONFIGURATION [ F ] [ B ] [ Y ]
MTOW [75000 ▽] [LBS ▽]
GALLEYS [ATLA ▽]
YEAR OF MANUFACTURE [1994 ▽] TO [1999 ▽]

SPECIFY LEASE DELIVERY REQUIREMENTS

▲ FIRST DELIVERY MONTH   [JAN ▽] [2001 ▽]   NO. OF AIRCRAFT [ ]
SECOND DELIVERY MONTH    [JAN ▽] [2001 ▽]   NO. OF AIRCRAFT [ ]
THIRD DELIVERY MONTH     [JAN ▽] [2001 ▽]   NO. OF AIRCRAFT [ ]

[SUBMIT]   [CLEAR]

FIG. 35

MANAGER CUSTOMER

AVAILABILITY QUERIES
CUSTOMER VIEW
FULL SEARCH
MANAGE CUSTOMER
DOCUMENTATION GENERATION
GENERATE NEW LOI
REVISE/COMPLETE EXISTING LOI
GENERATE NEW ASLA
REVISE/COMPLETE EXISTING ASLA
LEASE MANAGEMENT
VIEW CUSTOMER ACCOUNT
VIEW CUSTOMERS MRF BALANCES
VIEW MRF CLAIM STATUS

AIRLINES [AIRWAYS ▽]  (GO)

ENGINE TYPE [10]          THRUST [5]

EFIS [9]                  NEW/USED [3]

DELIVERY MONTH [8]        MTOW [6]

GALLEY TYPE [7]           SEATING CONFIGURATION [2]

NUMBER OF
AIRCRAFT FOR EACH [3]     TOTAL NO.
DELIVERY DATE             OF AIRCRAFT [6]

SEND EMAIL FOR ☑
CUSTOMER QUERY

[SAVE]   [RESET]   [CLOSE]

FIG. 36

PURCHASE/LEASE BACK

-SEARCH FOR CUSTOMER REQUEST

SEARCH FOR CUSTOMER REQUEST:

SELECT THE CUSTOMER, TIME PERIOD THEY MADE THE REQUEST WITHIN OR THE REQUEST ID NUMBER AND CLICK ON THE BUTTON BELOW

CUSTOMER: [ ▽ ]

TIME PERIOD [ ▽ ] REQUEST ID NUMBER [ ▽ ]

[ LOCATE REQUESTS ]

Sidebar menu:
- HOME
- NEW BUSINESS
  - LEASE EXTENSION
  - ADDITIONAL REQUIREMENT
  - PURCHASE LEASE BACK
  - ENGINE EXTENSION
  - ENGINE REQUIREMENT
- DEAL STATUS
  - TRANSACTION NUMBER
    - 2000500
    - 2000600
    - 2000700
- LEASE MANAGEMENT
  - STATEMENT OF ACCOUNT
  - INTEREST CHARGES
  - RENT RESET REPORT
  - VIEW INVOICES
  - VIEW INVOICES (ASP VERSION)
- MAINTENANCE RESERVES
  - RESERVE/SUPPLEMENTAL RENT
  - CLAIM GUIDELINES
  - MRP BACKUP SHEETS
  - MRP BACKUP SHEETS (ASP VERSION)
  - SUPPLEMENTAL RENT
  - SUBMIT NEW CLAIM
  - SUBMIT FOLLOW ON CLAIM
  - VIEW CLAIM STATUS

FIG. 37

PURCHASE/LEASE BACK

—SEARCH FOR CUSTOMER REQUEST – RESULTS

SEARCH RESULTS:

| REQUEST ID NUMBER | CUSTOMER: | ASSET TYPE(S): | | DATE REQUEST SUBMITTED: | |
|---|---|---|---|---|---|
| | | | | | REVIEW |
| | | | | | REVIEW |
| | | | | | REVIEW |
| | | | | | REVIEW |
| | | | | | REVIEW |

YOUR SEARCH PARAMETERS:

IF YOU WISH TO SEARCH AGAIN RESELECT THE CUSTOMER, THE TIME PERIOD OR REQUEST ID NUMBER AND CLICK ON 'NEW SEARCH'

CUSTOMER: ▽

TIME PERIOD ▽    REQUEST ID NUMBER

NEW SEARCH

---

HOME
NEW BUSINESS
LEASE EXTENSION
ADDITIONAL REQUIREMENT
PURCHASE LEASE BACK
ENGINE EXTENSION
ENGINE REQUIREMENT

DEAL STATUS
TRANSACTION NUMBER
2000500
2000600
2000700

LEASE MANAGEMENT
STATEMENT OF ACCOUNT
INTEREST CHARGES
RENT RESET REPORT
VIEW INVOICES
VIEW INVOICES (ASP VERSION)

MAINTENANCE RESERVES
RESERVE/SUPPLEMENTAL RENT
CLAIM GUIDELINES
MRP BACKUP SHEETS
MRP BACKUP SHEETS (ASP VERSION)

SUPPLEMENTAL RENT
SUBMIT NEW CLAIM
SUBMIT FOLLOW ON CLAIM
VIEW CLAIM STATUS

FIG. 38

GENERATE AN LOI

| | |
|---|---|
| △ | REVISE/COMPLETE EXISTING LOI ▽ AIRWAYS |

| QUERY NUMBER | AIRCRAFT TYPE | SERIAL NUMBER | DATE |
|---|---|---|---|
| BA001 | B73 -30 | S 12 | JAN 2002 |
| BA002 | A3 -20 | S 75 | MAR 2001 |

AVAILABILITY QUERIES
CUSTOMER VIEW
FULL SEARCH
MANAGE CUSTOMER
DOCUMENTATION GENERATION
GENERATE NEW LOI
REVISE/COMPLETE EXISTING LOI
GENERATE NEW ASLA
REVISE/COMPLETE EXISTING ASLA
LEASE MANAGEMENT
VIEW CUSTOMER ACCOUNT
VIEW CUSTOMERS MRF BALANCES
VIEW MRF CLAIM STATUS

FIG. 41

GENERATE AN ASLA

REVISE/COMPLETE EXISTING ASLA  [ AIRWAYS ▽ ]

| QUERY NUMBER | AIRCRAFT TYPE | SERIAL NUMBER | DATE |
|---|---|---|---|
| BA001 | B73 -30 | S 12 | JAN 2002 |
| BA002 | A3 -20 | S 75 | MAR 2001 |

AVAILABILITY QUERIES
CUSTOMER VIEW
FULL SEARCH
MANAGE CUSTOMER
DOCUMENTATION GENERATION
GENERATE NEW LOI
REVISE/COMPLETE EXISTING LOI
GENERATE NEW ASLA
REVISE/COMPLETE EXISTING ASLA
LEASE MANAGEMENT
VIEW CUSTOMER ACCOUNT
VIEW CUSTOMERS MRF BALANCES
VIEW MRF CLAIM STATUS

□ DEAL DETAILS

| LESSEE DETAILS | RENTAL | MRF RATES |

LESSEE TRADING NAME
ALEV

LESSEE REGISTERED NAME
ALEV AIRLINES

COUNTRY
HUNGARY

ADDRESS
FERIHEGY AIRPORT
BUDAPEST
HUNGARY

LESSEE CODE  MA

GENERATE TS    GENERATE ASLA    OPEN DOC    PUBLISH DOC    GO TO QUICKPLACE

ASSEMBLY OPTIONS

ANSWER FILE: 200693
[NEW] [OPEN] [LAST] [SAVE AS]

☐ SHOW ASSEMBLY

ASSEMBLE:
- ⊙ DOCUMENT
- ○ ANSWER SUMMARY
- ○ QUESTION SUMMARY

ASK:
- ⊙ ALL
- ○ UNANSWERED ONLY
- ○ NONE

[OK] [CANCEL] [HELP]

---

AVIATION SERVICES

LETTER OF INTENT

4. ATTENTION: - AZL

5. DEAR AZL

6. PLEASE FIND ATTACHED A SUMMARY TERM SHEET OUTLINING THE UNDERSTANDING REACHED ABOUT THE POTENTIAL LEASE OF A B73-4C ("AIRCRAFT") TO ALEV AIRLINES

7 THIS LETTER WITH ATTACHMENTS IS ONLY AN OUTLINE, NOT AN OFFER OR AGREEMENT TO LEASE. NO CONTRACT WILL EXIST UNTIL AN AIRCRAFT SPECIFIC LEASE AGREEMENT ("ASLA"), INCORPORATING AN AIRCRAFT COMMON TERMS AGREEMENT, IS SIGNED BY BOTH LESSOR AND LESSEE.

ACCORDINGLY THIS LETTER OF INTENT CREATES NO LEGAL OBLIGATIONS UNLESS AND UNTIL LESSOR AND LESSEE OBTAIN ALL NECESSARY CORPORATE APPROVALS AND THIRD PARTY CONSENTS THEN IT IS MUTUALLY INTENDED THAT THIS LETTER OF INTENT SHALL ONLY OBLIGE EACH PARTY TO NEGOTIATE IN GOOD FAITH TOWARDS A FINAL BINDING AGREEMENT.

PLEASE NOTE THAT THE AIRCRAFT REMAINS ON THE MARKET UNTIL WE HAVE RECEIVED THE DEPOSIT, THIS COUNTER SIGNED LETTER OF INTENT AND LESSEE'S MOST RECENT AUDITED ACCOUNTS, MANAGEMENT

| ALEV AIRLINES | | HOME>B73 40 2 MAY 01>CONTRACTS ROOM | |
|---|---|---|---|
| | | NEW PAGE | CLEANUP | |
| GO | CONTRACTS ROOM | | |
| [GO BACK] | TITLE ▽ | AUTHOR ▽ | MODIFIED ▽ |
| CONTRACTS ROOM | B73 -40 LOI | MOO, GERA | 10/18/2000 |
| BOARDROOM | B73 -40 LOI-SIGNED COPY (REVISION #A-D) | TA, AN | 10/20/2000 |
| CONTACT LIST | DRAFT ONE OF ASIA | TA, AN | 10/18/2000 |
| CALENDAR | TEST | BART, DAVID | 10/20/2000 |
| TASKS | TEST (REVISION #D 1 4) | BART, DAVIS | 10/20/2000 |
| DISCUSSIONS | TEST (REVISION #P 0 7) | BERG, PA | 10/20/2000 |
| ROOM INDEX | TEST (REVISION #N E 1) | O'BR, NO | 10/20/2000 |
| ROOM OPTIONS | | | |
| ROOM SECURITY | | | |
| TOOLS 🔍 | GO TO TOP | | NEW PAGE | CLEANUP |
| NEWS: DAILY|WEEKLY | | | |
| ADVANCED SEARCH | | | |
| CHAT|NOTIFY|PRINT|TUTORIAL | | | |
| HELP | | | LOCAL INTRANET |

FIG. 46

| ALEV AIRLINES | | | HOME>873 40 2 MAY 01>TASKS |
|---|---|---|---|
| | | NEW TASK PAGE  NEW...  CLEANUP  FOLDER... | |

[GO BACK]
CONTRACTS ROOM
BOARDROOM
CONTACT LIST
CALENDAR
TASKS
DISCUSSIONS
ROOM INDEX
ROOM OPTIONS
ROOM SECURITY

TASKS

ALL TASKS | MILESTONES | TO DO

| ▽TITLE ▽ | PRIORITY▽ | START DATE ▽ | DUE DATE ▽ | ASSIGNED TO▽ |
|---|---|---|---|---|
| ✓ INSPECT AIRCRAFT | MEDIUM | | 10/17/2000 | GYOR HAM |
| ! SIGN LOI | HIGH | | 10/20/2000 | DOUG WIN |
| ! ONSITE MEETING IN ALEV | | 10/23/2000 | 10/24/2000 | MICHA O'MA |

GO TO TOP

TOOLS
NEWS: DAILY|WEEKLY
ADVANCED SEARCH
CHAT|NOTIFY|PRINT|TUTORIAL
HELP

NEW TASK PAGE | NEW... | CLEANUP | FOLDER...

HTTP://3 208.110/QUICK    TEST/PAGE    200288103    ?OPENDATABASE    LOCAL INTRANET

| | | | HOME>B73 40 2 MAY 01>CALENDAR |
|---|---|---|---|

ALEV AIRLINES

CALENDAR

OCTOBER 2000 ← □□□□ → OCTOBER 2000

| MONDAY | TUESDAY | WEDNESDAY | THURSDAY | FRIDAY | SATURDAY | SUNDAY |
|---|---|---|---|---|---|---|
| 25 | 26 | 27 | 28 | 29 | 30 | 1 |
| 2 | 3 | 4 | 5 | 6 | 7 | 8 |
| 9 | 10 | 11 | 12 | 13 | 14 | 15 |
| 16 | 17 INSPECT AIRCRAFT | 18 | 19 | 20 SIGN LOI | 21 | 22 |
| 23 | 24 ONSITE MEETING IN ALEV | 25 | 26 | 27 | 28 | 29 |
| 30 | 31 | 1 | 2 | 3 | 4 | 5 |

TIMES SHOWN ARE: GREENWICH MEAN TIME

GO TO TOP NEW CALENDAR PAGE | NEW... | FOLDER....

GO
[GO BACK]
CONTRACTS ROOM
BOARDROOM
CONTACT LIST
CALENDAR
TASKS
DISCUSSIONS
ROOM INDEX
ROOM OPTIONS
ROOM SECURITY

TOOLS
NEWS: DAILY | WEEKLY
ADVANCED SEARCH
CHAT | NOTIFY | PRINT | TUTORIAL
HELP

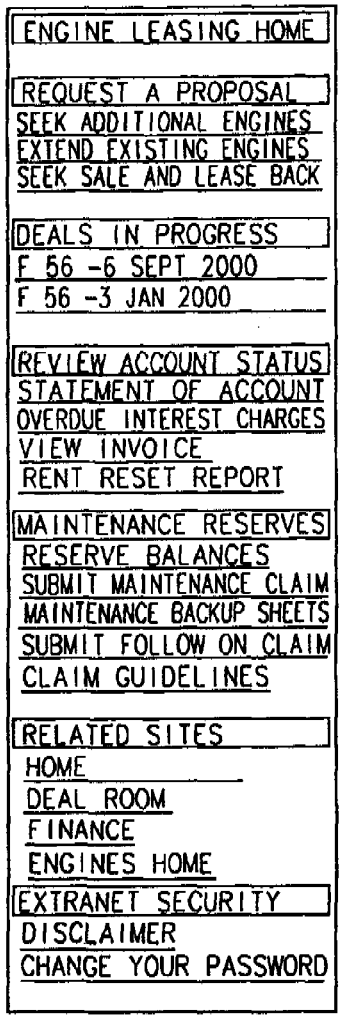
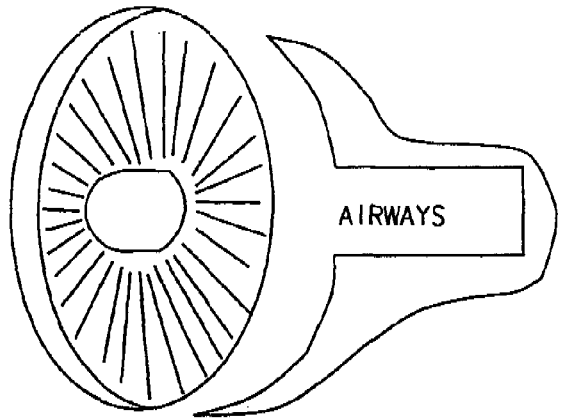
YOUR ENGINE LEASING DEAL ROOM
WELCOME JOE
PLEASE SELECT AN OPTION FROM THE MAIN MENU BAR
FIG. 49

LEASE EXTENSION

AIRWAYS  CURRENT FLEET

| ENGINE SERIAL NUMBER | ENGINE TYPE | CURRENT EXPIRY | NEW EXPIRY DATE | REQUEST EXTENSION TERM SHEET |
|---|---|---|---|---|
| S 123 | F 56-3 | 16-NOV-2000 | 16▽ NOV▽ 2002▽ | ☐ |

SUBMIT

ENGINE LEASING HOME

REQUEST A PROPOSAL
SEEK ADDITIONAL ENGINES
EXTEND EXISTING ENGINES
SEEK SALE AND LEASE BACK

DEALS IN PROGRESS
F 56 -6 SEPT 2000
F 56 -3 JAN 2000

REVIEW ACCOUNT STATUS
STATEMENT OF ACCOUNT
OVERDUE INTEREST CHARGES
VIEW INVOICE
RENT RESET REPORT

MAINTENANCE RESERVES
RESERVE BALANCES
SUBMIT MAINTENANCE CLAIM
MAINTENANCE BACKUP SHEETS
SUBMIT FOLLOW ON CLAIM
CLAIM GUIDELINES

RELATED SITES
HOME
DEAL ROOM
FINANCE
ENGINES HOME

EXTRANET SECURITY
DISCLAIMER
CHANGE YOUR PASSWORD

SEEK ADDITIONAL ENGINES

△ DENOTES A REQUIRED FIELD

SPECIFY ENGINE CRITERIA BELOW

| | | |
|---|---|---|
| △ ENGINE TYPE | F 56-3 ▽ | |
| △ ENGINE THRUST | 23500 ▽ | LBS |
| △ QEC CONFIGURATION | FULL ▽ | |
| △ FIRE WARNING HARNESS CONFIGURATION | GRAVINER ▽ | |
| ETOPS | YES ▽ | |
| NOISE CONFIGURATION | STAGE 2 ▽ | |

SPECIFY DATA FOR PROPOSAL AND DELIVERY

| | | | |
|---|---|---|---|
| △ LEASE TERM | 12 ▽ | ○ DAYS ⊙ MONTHS ○ YEARS | |
| △ FIRST LEASE START DATE | SEPT ▽ | 2000 ▽ | NO. OF ENGINES |
| SECOND LEASE START DATE | OCT ▽ | 2000 ▽ | NO. OF ENGINES |
| THIRD LEASE START DATE | NOV ▽ | 2000 ▽ | NO. OF ENGINES |
| △ ANNUAL UTILISATION | 3000 ▽ | NO. FLIGHT HOURS | |
| △ HOUR TO CYCLE RATIO | 1:1 | | |
| MINIMUM EGT MARGIN | 50 | DEGREES CELSIUS | |
| INSTALLATION LOCATION | EUROPE ▽ | | |

[SUBMIT] [CLEAR]

Sidebar menu:

ENGINE LEASING HOME

REQUEST A PROPOSAL
SEEK ADDITIONAL ENGINES
EXTEND EXISTING ENGINES
SEEK SALE AND LEASE BACK

DEALS IN PROGRESS
F 56 -6 SEPT 2000
F 56 -3 JAN 2000

REVIEW ACCOUNT STATUS
STATEMENT OF ACCOUNT
OVERDUE INTEREST CHARGES
VIEW INVOICE
RENT RESET REPORT

MAINTENANCE RESERVES
RESERVE BALANCES
SUBMIT MAINTENANCE CLAIM
MAINTENANCE BACKUP SHEETS
SUBMIT FOLLOW ON CLAIM
CLAIM GUIDELINES

RELATED SITES
HOME
DEAL ROOM
FINANCE
ENGINES HOME

EXTRANET SECURITY
DISCLAIMER
CHANGE YOUR PASSWORD

FIG. 51

INQUIRY RESULTS

YOUR QUERY NUMBER IS BA001

SEARCH CRITERIA USED

| | | | |
|---|---|---|---|
| ENGINE TYPE | F 56-3 | ENGINE THRUST | 23,500 LBS |
| QEC CONFIGURATION | FULL | FIRE WARNINF HARNESS CONFIG | GRAVINER |
| ETOPS | YES | LEASE START DATE | 20-SEPT-2000 |

THE FOLLOWING ENGINES ARE THE NEAREST MATCH TO YOUR SEARCH CRITERIA

F 56-3   SERIAL 123   AIRWORTHINESS TAG   LLP DESCRIPTION   AD STATUS ☑REQUEST TERM SHEET

| ENGINE TYPE | ENGINE THRUST | QEC CONFIGURATION | TSLSV | ETOPS | LLP LIMITER | AVAILABLE | HOUSEKEEPING LOCATION |
|---|---|---|---|---|---|---|---|
| F 56-3 | 23,500 LBS | FULL | 3000 HRS | YES | 5000 CYCLES | 30-SEPT-00 | OWS-LONDON |

F 56-3   SERIAL 24   AIRWORTHINESS TAG   LLP DESCRIPTION   AD STATUS ☐REQUEST TERM SHEET

| ENGINE TYPE | ENGINE THRUST | QEC CONFIGURATION | TSLSV | ETOPS | LLP LIMITER | AVAILABLE | HOUSEKEEPING LOCATION |
|---|---|---|---|---|---|---|---|
| F 56-3 | 23,500 LBS | FULL | 1000 HRS | YES | 3500 CYCLES | 30-SEPT-00 | OWS-DALLAS |

SPECIAL MODIFICATIONS OR OTHER COMMENTS:

IF YOU DO NOT FIND AS APPROPRIATE MATCH, OR HAVE A QUESTION, SELECT "CONTACT ME"

[SUBMIT REQUEST]   [CLOSE]   [CONTACT ME]

---

ENGINE LEASING HOME

REQUEST A PROPOSAL
SEEK ADDITIONAL ENGINES
EXTEND EXISTING ENGINES
SEEK SALE AND LEASE BACK

DEALS IN PROGRESS
F 56 -6 SEPT 2000
F 56 -3 JAN 2000

REVIEW ACCOUNT STATUS
STATEMENT OF ACCOUNT
OVERDUE INTEREST CHARGES
VIEW INVOICE
RENT RESET REPORT

MAINTENANCE RESERVES
RESERVE BALANCES
SUBMIT MAINTENANCE CLAIM
MAINTENANCE BACKUP SHEETS
SUBMIT FOLLOW ON CLAIM
CLAIM GUIDELINES

RELATED SITES
HOME
DEAL ROOM
FINANCE
ENGINES HOME

EXTRANET SECURITY
DISCLAIMER
CHANGE YOUR PASSWORD

FIG. 52

THANK YOU FOR REQUESTING A TERM SHEET

YOUR REQUEST HAS BEEN FORWARDED TO ENGINE LEASING. WE WILL CONTACT YOU WITHIN 24 HOURS. PLEASE CONFIRM YOUR CONTACT DETAILS, WHERE INCORRECT PLEASE MODIFY.

FIRST NAME
INITIAL  LAST NAME
STREET ADDRESS
CITY
STATE
COUNTRY
ZIP
E-MAIL ADDRESS
WORK PHONE

SUBMIT

FIG. 53

ENGINE LEASING HOME
REQUEST A PROPOSAL
SEEK ADDITIONAL ENGINES
EXTEND EXISTING ENGINES
SEEK SALE AND LEASE BACK

DEALS IN PROGRESS
F 56 -6 SEPT 2000
F 56 -3 JAN 2000

REVIEW ACCOUNT STATUS
STATEMENT OF ACCOUNT
OVERDUE INTEREST CHARGES
VIEW INVOICE
RENT RESET REPORT

MAINTENANCE RESERVES
RESERVE BALANCES
SUBMIT MAINTENANCE CLAIM
MAINTENANCE BACKUP SHEETS
SUBMIT FOLLOW ON CLAIM
CLAIM GUIDELINES

RELATED SITES
DEAL ROOM
FINANCE
ENGINES HOME

CONTACT US
NEED ASSISTANCE?
FEEDBACK

EXTRANET SECURITY
DISCLAIMER
CHANGE YOUR PASSWORD

FULL SEARCH

▲ DENOTES A REQUIRED FIELD

SPECIFY ENGINE CRITERIA BELOW

| | | |
|---|---|---|
| ▲ ENGINE TYPE | F 56-3 ▽ | |
| ▲ AIRCRAFT TYPE | B73 ▽ | |
| ▲ ENGINE THRUST | 23500 ▽ | LBS |
| ▲ QEC CONFIGURATION | FULL ▽ | |
| FIRE WARNING HARNESS CONFIGURATION | GRAVINER ▽ | |
| ETOPS | YES ▽ | |
| NOISE CONFIGURATION | STAGE 2 ▽ | |

SPECIFY DATA FOR DELIVERY

| | | | |
|---|---|---|---|
| ▲ FIRST LEASE START DATE | 30 ▽ | SEPT ▽ | 2000 ▽ | NO. OF ENGINES |
| SECOND LEASE START DATE | OCT ▽ | 2000 ▽ | | NO. OF ENGINES |
| THIRD LEASE START DATE | NOV ▽ | 2000 ▽ | | NO. OF ENGINES |
| INSTALLATION LOCATION | EUROPE ▽ | | |

[ SUBMIT ]   [ CLEAR ]

AVAILABILITY QUERIES
CUSTOMER VIEW
FULL SEARCH
MANAGE CUSTOMER

DOCUMENTATION GENERATION
GENERATE NEW LOI
REVISE/COMPLETE EXISTING LOI
GENERATE NEW ESLA
REVISE/COMPLETE EXISTING ESLA

LEASE MANAGEMENT
VIEW CUSTOMER ACCOUNT
VIEW CUSTOMERS MRF BALANCES
VIEW MRF CLAIM STATUS

FIG. 56

MANAGE CUSTOMER

AVAILABILITY QUERIES
CUSTOMER VIEW
FULL SEARCH
MANAGE CUSTOMER

DOCUMENTATION GENERATION
GENERATE NEW LOI
REVISE/COMPLETE EXISTING LOI
GENERATE NEW ESLA
REVISE/COMPLETE EXISTING ESLA

LEASE MANAGEMENT
VIEW CUSTOMER ACCOUNT
VIEW CUSTOMERS MRF BALANCES
VIEW MRF CLAIM STATUS

AIRLINE [AIRWAYS ▽] (GO)
ENGINE TYPE [ ]
ENGINE THRUST [ ]
QEC CONFIGURATION [ ]
ETOPS QUALIFIED [ ]
FIRST LEASE START DATE [ ]
NO. OF ENGINES FOR [ ]   TOTAL NO. OF ENGINES [ ]
EACH LEASE START DATE

SEND EMAIL FOR CUSTOMER QUERY ☑

[SAVE]   [RESET]   [CLOSE]

FIG. 57

METHODS AND SYSTEMS FOR LEASING EQUIPMENT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to methods and systems for facilitating transactions relating to equipment leases and more particularly to methods and systems for facilitating customer initiation, selection, analysis, approval, and closing of a lease transaction.

Operators sometime determine that leasing particular equipment is more economical than purchasing the equipment. For example, operators of commercial aircraft fleets and even smaller aircraft sometimes determine that leasing aircraft, or aircraft engines, is more economical than purchasing the equipment. Owners of aircraft fleets, therefore, lease aircraft to commercial aircraft operators and other operators for use.

In leasing aircraft, for example, a higher rate of return is achieved by ensuring that upon expiration of a current lease for a particular aircraft, a subsequent lease is in place for that aircraft. Managing a fleet of aircraft, including ensuring that the desired aircraft are available according to the lease terms and optimizing the rate of return, requires close coordination of numerous aircraft leases and aircraft maintenance requirements.

In addition, lease transactions related to equipment such as engines and aircraft typically require weeks, if not months, to close and are highly paper intensive. For example, and with respect to aircraft leases, a potential customer typically must be educated regarding the various aircraft and options which satisfy the customer mission requirements. The potential customer then typically wants to understand the different lease terms that apply to each aircraft and option. Identifying the many different aircraft and options that satisfy the customer mission requirements, and then determining the lease terms that apply to each identified aircraft and option, typically is time consuming.

The process of identifying the many different aircraft and options that satisfy the customer mission requirements also is highly dependent on the experience of the sales person having responsibility for the particular customer. For example, a more experienced sales person who has handled many lease transactions may be able to identify a wider variety of aircraft and options that satisfy the customer mission requirements than a newly hired sales person.

Once the customer has finalized the aircraft selections, a term sheet, or letter of intent, typically is created so that a clear understanding is developed on key terms to be included in a definitive lease. The term sheet typically is created by the responsible sales person and is reviewed by a lawyer. In an organization having many different sales people creating term sheets for a high volume of lease transactions, there may not be consistency with respect to the form and terms contained in the term sheets. Since the term sheets are used in generating definitive leases, the wide array of term sheet forms and terms does not facilitate efficiency in generating the definitive lease. For example, simply locating key lease terms on the many different term sheet forms used by the sales people can be a time consuming task.

BRIEF SUMMARY OF THE INVENTION

Systems and methods that facilitate both customer and fleet manager productivity from selection of particular equipment desired to be leased through delivery are described herein. In one exemplary embodiment, the system includes a server having a database for storing data relating to an aircraft fleet. The stored data includes specific information relating to aircraft in the fleet, as well as terms of existing leases for those aircraft in the fleet then currently leased. The system is accessible to the customer via a network such as a wide area network, e.g., an extranet accessible via the Internet, so that the customer can query the database and identify aircraft that meet specific mission requirements.

More specifically, once a customer logs onto the system, the system prompts the customer, e.g., via a display, to enter information relating to a type of transaction desired to be completed. The transaction can, for example, be a new lease, an extension of a current lease, or a sale and lease back transaction. Once the customer selects a type of transaction to be completed, the system then obtains, e.g., via the display that prompts the customer for inputs, additional information based on the transaction type.

Once the required information has been obtained, then the marketing executive generates a term sheet using the data input into the system database by the customer. Specifically, the marketing executive queries the data base to determine whether the customer has selected a particular aircraft for lease and for specific lease terms acceptable to the customer. Then, using a deal management sub-system, the marketing executive generates a term sheet by populating a pre-defined term sheet with data stored in the database.

The system facilitates meeting customer requirements in that a customer can readily select, via the system, multiple aircraft desired for lease without requiring involvement of the marketing executive. Such selections can be made by the customer any time, anywhere, at the customer's convenience. Once the customer submits the selections, the marketing executive then initiates and actually prepares the term sheets for the aircraft based on the actual customer selections. The system also is not dependent upon the experience of the marketing executive, which facilitates efficient and uniform generation of term sheets and lease contracts.

The system also facilitates managing a fleet of aircraft so that a second lease is in place for an aircraft upon expiration of a first lease. For example, a customer can determine availability of aircraft that meet the customer criteria and the customer can request a term sheet for such aircraft that requires delivery upon expiration of the current lease.

BRIEF DESCRIPTION OF THE DRAWINGS

FIG. 7 is an exemplary screen shot of a page for displaying and obtaining information relating to a lease extension;

FIG. 8 is an exemplary screen shot of a page for displaying and obtaining information relating to aircraft;

FIG. 9 is an exemplary screen shot of a page for displaying results of searching for an aircraft specified on the page illustrated in FIG. 8;

FIG. 10 is an exemplary screen shot of a technical specification page for an aircraft listed on the page illustrated in FIG. 9;

FIG. 11 is an exemplary screen shot of a delivery conditions page for an aircraft listed on the page illustrated in FIG. 9;

FIG. 12 is an exemplary screen shot of a technical requirements page, which may displayed as a sub-window after a customer selects Request Term Sheet, for an aircraft listed on the page illustrated in FIG. 9;

FIG. 13 is an exemplary screen shot of a confirmation page which may be displayed after submitting a request for a term sheet via the page illustrated in FIG. 8;

FIG. 15 is an exemplary screen shot illustrating a new request/amend old request page;

FIG. 16 is an exemplary screen shot illustrating a search result page;

FIG. 17 is an exemplary screen shot of a page for entering aircraft types;

FIG. 18 is an exemplary screen shot of a page for entering aircraft details.

FIG. 19 is an exemplary screen shot of a continuation of the page shown in FIG. 18;

FIG. 20 is an exemplary screen shot of a page for entering aircraft conditions;

FIG. 21 is an exemplary screen shot of a continuation of the page shown in FIG. 20;

FIG. 22 is an exemplary screen shot of a continuation of the page shown in FIG. 21;

FIG. 23 is an exemplary screen shot of a page for entering engine conditions;

FIG. 24 is an exemplary screen shot of a continuation of the page shown in FIG. 23;

FIG. 25 is an exemplary screen shot of a continuation of the page shown in FIG. 24;

FIG. 26 is an exemplary screen shot of a page for entering proposed lease conditions and to request a term sheet;

FIG. 27 is an exemplary screen shot of a continuation of the page shown in FIG. 26;

FIG. 28 is an exemplary screen shot of a continuation of the page shown in FIG. 27;

FIG. 29 is an exemplary screen shot of a page for requesting a term sheet;

FIG. 30 is an exemplary screen shot of a continuation of the page shown in FIG. 29;

FIG. 31 is an exemplary screen shot of a page for editing address information;

FIG. 32 is an exemplary screen shot of a continuation of the page shown in FIG. 31;

FIG. 33 is an exemplary screen shot of a customer view query page;

FIG. 34 is an exemplary screen shot of a customer view query page including a display of search results;

FIG. 35 is an exemplary screen shot of a full search query page;

FIG. 36 is an exemplary screen shot of a query page for facilitating management of customers;

FIG. 37 is an exemplary screen shot of a page for searching for customer requests on a purchase lease back transaction;

FIG. 38 is an exemplary screen shot of a search results page;

FIG. 41 is an exemplary screen shot of a page for displaying the results of searching for information selected via the page illustrated in FIG. 40;

FIG. 42 is an exemplary screen shot of a page for displaying the results of searching for information selected via a page identical to the page illustrated in FIG. 40 except for an aircraft specific lease agreement (ASLA) rather than a letter of intent;

FIG. 43 is an exemplary windows based data input display for selecting a particular deal for generation of a letter of intent via a deal management sub-system;

FIG. 44 is an exemplary display of deal details generated after a marketing executive selects a particular deal via the display shown in FIG. 43;

FIG. 45 is an exemplary display of a letter of intent generated after a marketing executive selects "Generate TS" via the display shown in FIG. 44;

FIG. 46 is an exemplary display of a contracts room;

FIG. 47 is an exemplary display of tasks;

FIG. 48 is an exemplary display of a calendar;

FIG. 49 is an exemplary screen shot of a home page for a deal room relating to aircraft engine leases;

FIG. 50 is an exemplary screen shot of a page for displaying and obtaining information relating to an engine lease extension;

FIG. 51 is an exemplary screen shot of a page for displaying and obtaining information relating to engines;

FIG. 52 is an exemplary screen shot of a page for displaying results of searching for an engine specified on the page illustrated in FIG. 51;

FIG. 53 is an exemplary screen shot of a page for confirming contact details;

FIG. 56 is an exemplary screen shot of a full search query page for aircraft engines; and FIG. 57 is an exemplary screen shot of a page for managing a customer.

DETAILED DESCRIPTION OF THE INVENTION

Set forth below is a description of exemplary methods and systems for facilitating, and closing, lease transactions. While the methods and systems are sometimes described in the context of leases for aircraft and leases for engines, the methods and systems are not limited to practice in connection with only aircraft and engines. The methods and systems can be used, for example, in connection with leases for automobiles, rail cars, barges, and many other different types of equipment.

Figure 1:
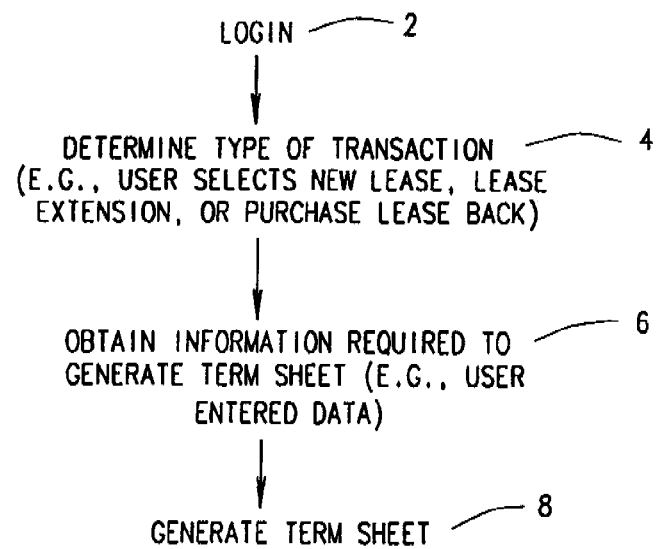
FIG. 1 is a flow chart illustrating process steps for generating a term sheet.

FIG. 1 is a flow chart illustrating process steps for generating a term sheet. The term "term sheet" as used herein refers to a summary, in electronic and/or printed form, of key business provisions intended to be included in a complete and fully executed contract. The term "term sheet" is used herein interchangeably with the term "letter of intent". As with a term sheet, a letter of intent is a summary, in electronic and/or printed form, of key business provisions intended to be included in a complete and fully executed contract. A term sheet differs from a letter of intent in that a term sheet typically is in outline form, and a letter of intent typically is in letter form.

Referring now specifically to FIG. 1, and in one exemplary embodiment of a system for generating a term sheet, after a customer logs into the system 2, the system prompts the customer, e.g., via a display that prompts the customer for inputs, to enter information relating to a type of transaction desired to be completed 4. The transaction can, for example, be a new lease, an extension of a current lease, or a sale and lease back transaction. Of course, the system is not limited to any one specific type of transaction. Once the customer inputs information relating to a type of transaction to be completed, the system then obtains, e.g., via a display that prompts the customer for inputs, additional information based on the transaction type 6. The particular information required by the system to generate a term sheet is dependent upon the specific type of transaction. Once the required information has been obtained, a term sheet can then be generated 8.

Set forth below are details regarding exemplary hardware architectures (FIGS. 2 and 3), an exemplary process flow chart illustrating processing for various types of transactions (FIG. 5), exemplary screen shots displayed by the exemplary system to a customer desiring a term sheet (FIGS. 6–33), exemplary screen shots displayed to customer for facilitating preparation of the term sheet (FIGS. 34–43), exemplary displays in a windows based deal management system for generating the term sheet (FIGS. 44–49), and exemplary screen shots of an aircraft engine system (FIGS. 50–58). In addition, an exemplary data scheme is set forth Appendix 1, and an exemplary term sheet is set forth in Appendix 2. Although specific exemplary embodiments of methods and systems for generating term sheets are described herein, the methods and systems are not limited to such specific exemplary embodiments.

Hardware Architecture

Figure 2:
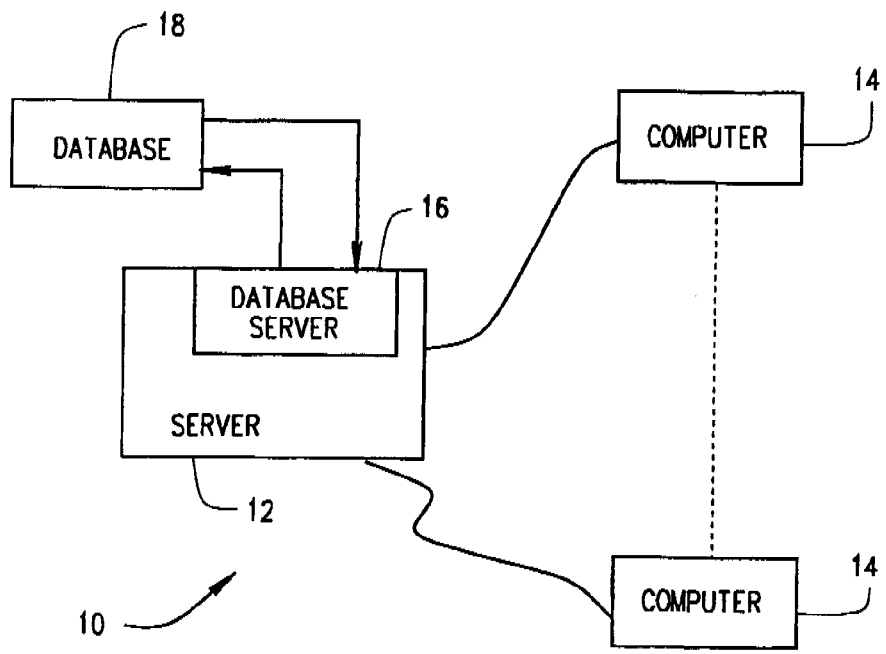
FIG. 2 is a block diagram of a client-server system.

FIG. 2 is a block diagram of a system 10 that includes a server sub-system 12, sometimes referred to herein as server 12, and a plurality of customer devices 14 connected to server 12. In one embodiment, devices 14 are computers including a web browser, and server 12 is accessible to devices 14 via a network such as an intranet or a wide area network such as the Internet. In an alternative embodiment, devices 14 are servers for a network of customer devices.

Devices 14 are interconnected to the network, such as a local area network (LAN) or a wide area network (WAN), through many interfaces including dial-in-connections, cable modems and high-speed lines. Alternatively, devices 14 are any device capable of interconnecting to a network including a web-based phone or other web-based connectable equipment. Server 12 includes a database server 16 connected to a centralized database 18. In one embodiment, centralized database 18 is stored on database server 16 and is accessed by potential customers at one of customer devices 14 by logging onto server sub-system 12 through one of customer devices 14. In an alternative embodiment centralized database 18 is stored remotely from server 12.

Figure 3:
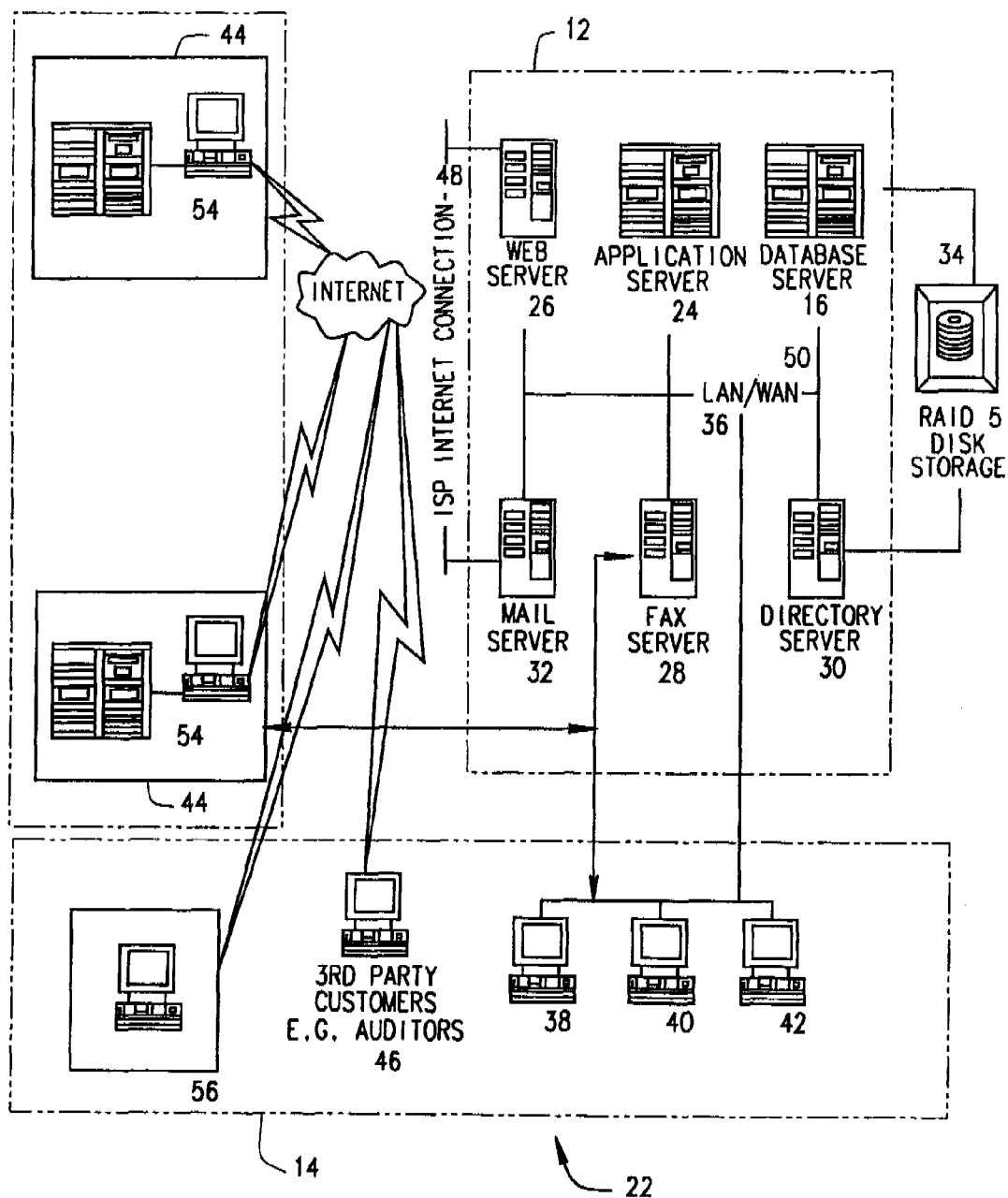
FIG. 3 is a block diagram of a network based system.

FIG. 3 is a block diagram of a network based system 22. System 22 includes server sub-system 12 and customer devices 14. Server sub-system 12 includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator work station 38, a work station 40, and a supervisor work station 42 are coupled to LAN 36. Alternatively, work stations 38, 40, and 42 are coupled to LAN 36 via an Internet link or are connected through an intranet.

Each work station 38, 40, and 42 is a personal computer including a web browser. Although the functions performed at the work stations typically are illustrated as being performed at respective work stations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

Server sub-system 12 is configured to be communicatively coupled to various individuals or employees 44 and to third parties, e.g., customer, 46 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 50, local area network 36 could be used in place of WAN 50.

In the exemplary embodiment, any employee 44 or customer 46 having a work station 52 can access server sub-system 12. One of customer devices 14 includes a work station 54 located at a remote location. Work stations 52 and 54 are personal computers including a web browser. Also, work stations 52 and 54 are configured to communicate with server sub-system 12. Furthermore, fax server 28 communicates with employees 44 and customers 46 located outside the business entity and any of the remotely located customer systems, including a customer system 56 via a telephone link. Fax server 28 is configured to communicate with other work stations 38, 40, and 42 as well.

Figure 4:
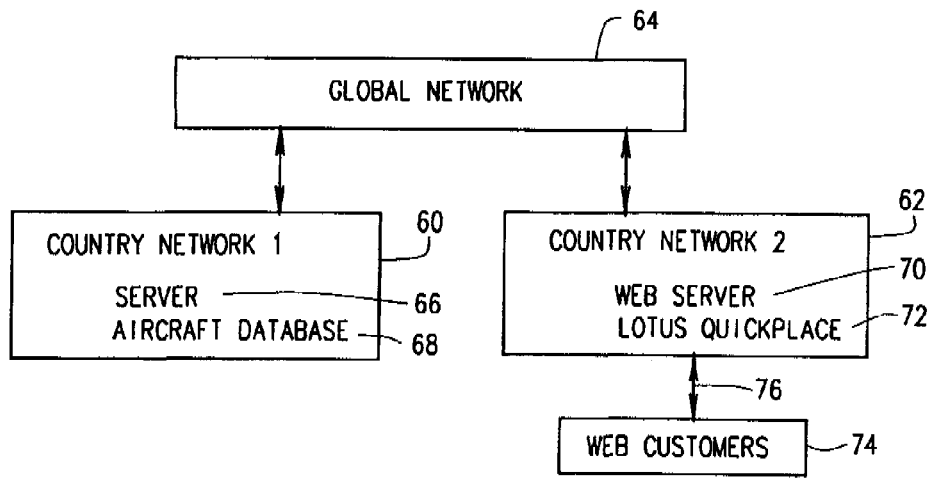
FIG. 4 is a block diagram illustrating network connectivity.

FIG. 4 is a block diagram illustrating network connectivity. As shown in FIG. 4, a first country network 60 and a second country network 62 are interconnected by a global network 64. First network 60 includes a server 66 and a database 68 storing information related to aircraft. Second country network 62 includes a web server 70 as well as a Quickplace application 72 so that a customer 74, who accesses second country network 62 via a wide area network 76 such as the Internet, can post requests and other information in a shared environment.

Although the servers are illustrated in FIG. 4 as being geographically remote, the server functionality can be combined into one centrally located server. As used herein, therefore, the term server includes both a single server as well as interconnected distributed servers.

In one specific exemplary embodiment, the following commercially available hardware and software are utilized: Web Server platform Windows NT 4.0 SP 5; Database Server platform Windows NT 4.0; Internet Information Server (IIS) 4.0; Microsoft Transaction Server (MTS); COM objects using VB 6.0 dlls; Active Server Pages 3.0; JScript 5.0; VBScript 5.0; and Database Oracle 7.3.4. The extranet site operates under IE 4.0 and Netscape 4.0.

Data Schema

In an exemplary embodiment, data is stored in the database in accordance with the data schema set forth in Appendix 1. Information regarding each customer, as well as information regarding each aircraft in the aircraft fleet is contained in the database. Of course, the data can be stored in many different forms using many different structures, and the data schema set forth in Appendix 1 illustrates just one form and structure for the data.

More particular, and referring to Appendix 1, data regarding each query made by a customer (Availability_Query), required customer delivery information (Required_del_dates), and the results of each query search (Result_of_Query) are stored in the database. Additional information relating to each specific customer such as the specified aircraft configuration (Customer_Configuration) and general customer information (CUST_EXEC) also is stored in the database.

Fleet information such as the data specified under the headers World_Fleet and DSS_ENQ is stored in the database. Further, aircraft availability information (AVAILABILITY) is stored in the database.

Process Flow

Figure 5:
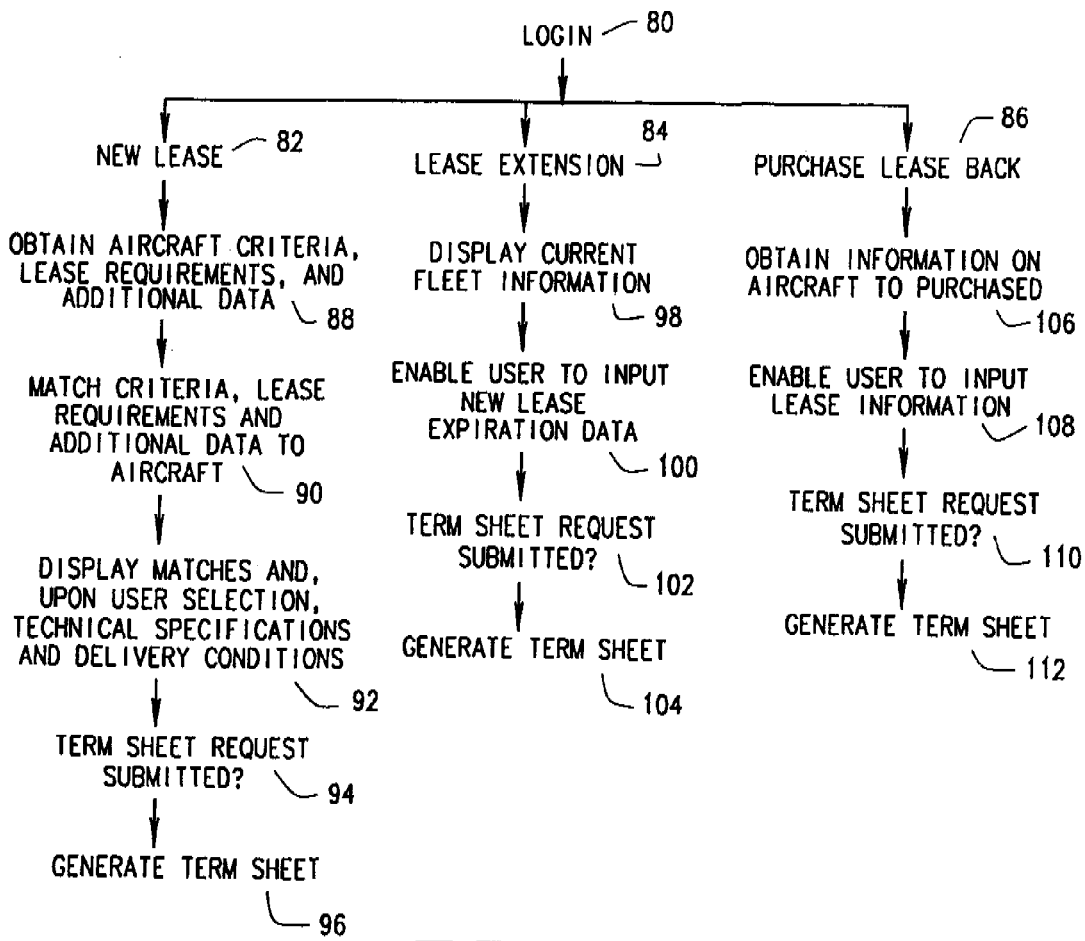
FIG. 5 is a flow chart illustrating process steps for generating terms sheets for a new lease, a lease extension, and a sale and lease back transaction.

FIG. 5 is a flow chart illustrating process steps for generating term sheets for a new lease, a lease extension, and a sale and lease back transaction. Prior to executing the process illustrated in FIG. 5, the database for the aircraft in the existing fleet is built and incorporated into the system. Such data is used, as described below in more detail, to identify aircraft which match customer requirements as well as to enable a customer to view data regarding the existing customer fleet.

More specifically, and referring to FIG. 5, after logging 80 a customer into the system, the system prompts a customer to select whether to choose a new lease 82, a lease extension 84, or a purchase lease back transaction 86. The login process validates a customer (e.g., matches the login name and password to login names and passwords pre-stored in the database) and only registered customers have access to the site. A new customer applies for a registration for the site.

Once the customer information is validated, if the customer selects new lease 82, then the system prompts the customer to obtain aircraft criteria, lease requirements, and additional data relating to the new lease transaction 88. The data input by the customer is used by the system to build the portion of the database for the customer query. The availability requests submitted by the customer are stored in the database to provide the customer an option to re-query on his previous searches, and to allow the marketing executive to keep track of customer requests and behavior.

Once the required data has been input, the system then matches 90 the criteria, lease requirements, and additional data to aircraft in the fleet. In addition, an email is sent to the appropriate marketing executive with the customer details, query number, and all other related information entered in the search page. The email contains a link to the site.

The system compares the input data with data regarding each aircraft in the fleet to determine exact as well as near matches that satisfy the customer requirements. In one specific exemplary embodiment, only an exact match on aircraft type and series is required for an aircraft to be returned. The following rules are used in the specific exemplary embodiment when evaluating search criteria.

1. Only aircraft selected as being available by the fleet manager can be returned by the search. If the exact match is not available in the specified delivery date, matches in nearest available months are displayed.

2. For each aircraft viewable by the customer, a country may be identified into which that aircraft may not be leased. One such country can be identified per aircraft. Rather than a specific country, the restriction can apply to a region or country such as EU for Eurocontrol restricted aircraft.

3. For each aircraft, a tax based restriction may be specified. One such restriction can be specified per aircraft. The restriction will take the form of a geographical region, e.g, North America, Europe.

4. Engine Type and Thrust drop down list is populated depending on the Aircraft Type and Series selected.

5. EFIS or non EFIS is visible depending on the Aircraft Type selected. This option is applicable only for MD80 and B737 type aircraft.

6. If new aircraft is selected, the date of manufacture is not viewable by the customer.

7. For each customer, a number of aircraft to be displayed may be specified. The maximum number of aircraft returned to the customer as a result of a query can vary by customer and will initially be set to 3 aircraft for each delivery date and not more than 6, per query, for each customer.

8. MTOW is a drop down box populated with the most popular weights for the aircraft type selected.

A weighting system is used to match the selection criteria and the available aircraft. The weighting system takes into account the number of criteria which an aircraft matches and the relative importance of each criteria. If the tax based restriction comes into effect for a particular aircraft, that aircraft is given a weighting which puts it last on the list of aircraft to be offered to the customer. This restriction does not apply where the aircraft is a wide body aircraft. Further details regarding an exemplary weighting system are set forth below.

Once the search is complete, the search results are displayed 92 to the customer. Where more than 3 aircraft match the mandatory criteria, and if only 3 aircraft are to be displayed to the customer, the 3 aircraft with the highest weighting are presented to the customer. The display of aircraft found in the search, in the exemplary embodiment, is color-coded. For example, each returned aircraft having attributes which match the customer criteria are displayed in white, and those that do not match are displayed in yellow. The search results include the basic aircraft information (e.g., type and series, serial number, date of manufacture, galley type, MTOW, availability date).

In addition to displaying the search results, the customer is given the option to view the technical specification for the listed aircraft, to view the delivery conditions for the listed aircraft, and to request a term sheet for the listed aircraft. If the request a term sheet option is selected 94, the customer is presented with a screen which prompts the customer for additional information necessary to prepare the term sheet. The additional information includes, for example, technical requirements which vary from the technical specification, required lease term, expected hour to cycle ratio, expected annual utilization, and country of registration. The customer can also make further comments/clarifications in a comment box when requesting a term sheet, as well as confirm contact details. The customer then exits the site, or returns to perform another transaction.

Each customer term sheet request is stored in the database, and an email is sent to a technical project manager for comment on feasibility, lead times and cost estimate for additional technical requirements, a marketing executive detailing the request (includes the customer details, search criteria and the aircraft returned in response to that search), and to the customer acknowledging the inquiry, assigning a transaction number to the term sheet request, and confirming that a response would be issued within a specified time frame 96.

Rather than performing a new lease transaction 82, a customer may elect to perform a lease extension transaction 84. Generally, this transaction is for extending the term of an existing lease. Upon selecting lease extension, the customer is presented with a screen listing the customer existing fleet with current lease termination dates for each aircraft 98. Each aircraft listing includes a drop down box which allows the customer to enter the new desired lease termination date 100 for the aircraft and an option allowing the customer to request a term sheet for an extension to the new date 102. If a term sheet is requested 102, then a term sheet may be generated 104 as described below.

A customer may also elect to perform a purchase lease back transaction 86. The system prompts the customer to obtain information on the aircraft to be purchased 106, and also provides the customer with pages to enable the customer to input lease information 108. If the customer requests a term sheet 110, then a term sheet may be generated 112 as described below.

Exemplary Customer Viewable Screen Shots

To implement the process described above, many variations of particular screens viewable by a customer can be utilized. The following description refers to one set of screens that can be used to prompt a customer to make the necessary inputs to enable the system to generate a term sheet. Of course, many variations of such screens are possible.

Figure 6:
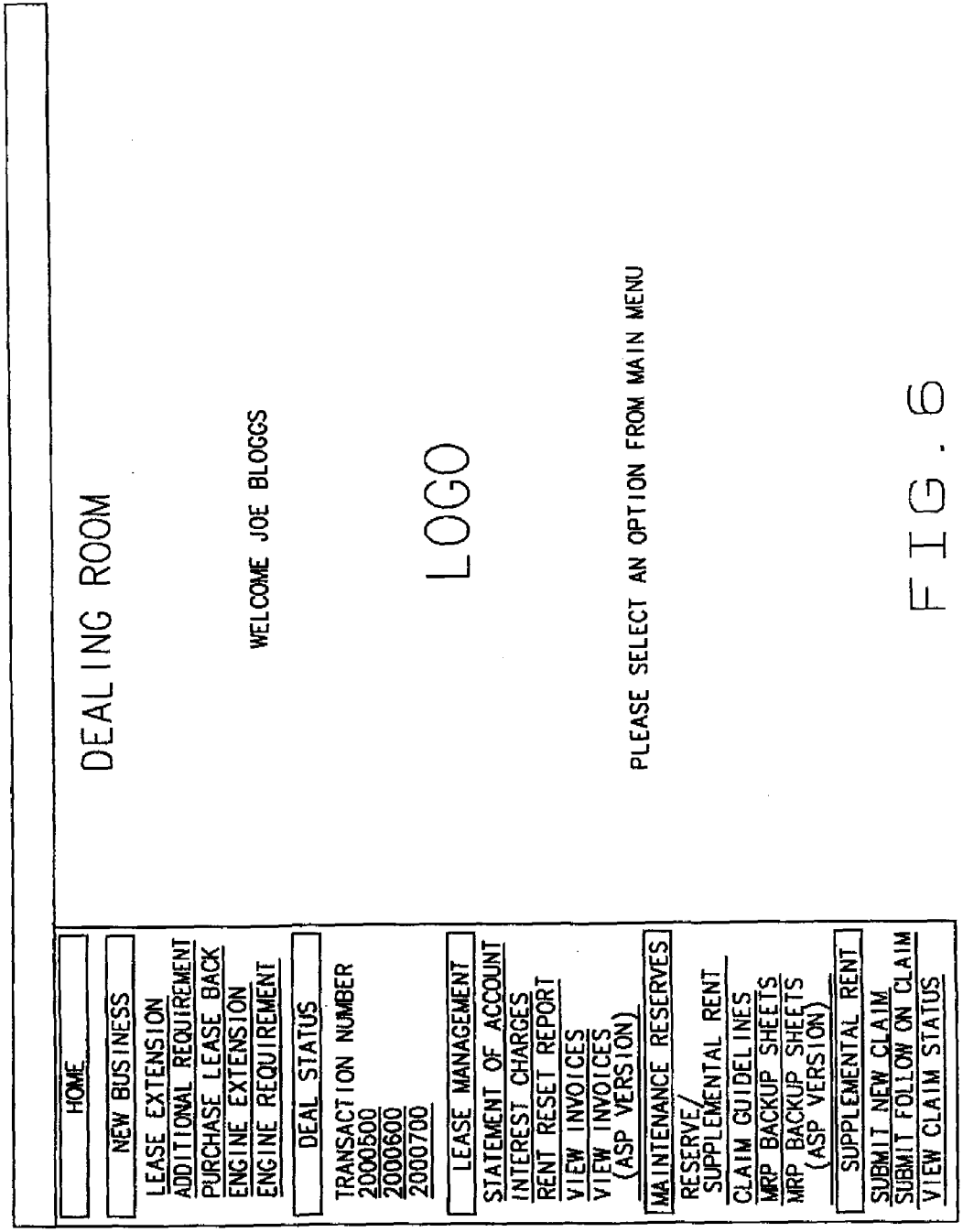
FIG. 6 is an exemplary screen shot of a home page for a deal room relating to aircraft leases.

Referring now again specifically to the drawings, FIG. 6 is an exemplary screen shot of a home page for a deal room relating to aircraft leases. Each customer has a custom home page that displays the name of the particular authorized individual and customer name. Once the customer logs into the system, the system displays the deal room screen shown in FIG. 6. The customer can then select specific proposals, deals, account status information, and maintenance reserves to view. Additionally, the customer can link to related sites or view extranet security features.

If the customer select "Extend Existing Aircraft" under "Request a Proposal", then the screen shown in FIG. 7 is displayed. Specifically, the customer is presented with a screen listing the customer existing fleet with current lease termination dates for each aircraft. Each aircraft listing includes a drop down box (New Expiry Date) which allows the customer to enter the new desired lease termination date for the aircraft. The customer can also select "Request Extension Term Sheet". If the customer does select a term sheet, then the screen (see, e.g., FIG. 12) is displayed so that the customer can confirm contact information.

If, at the deal room page illustrated in FIG. 6, the customer selects "Seek Additional Aircraft", then the screen shown in FIG. 8 is displayed to the as customer. This screen enables the customer to enter, or specify, aircraft criteria, lease delivery requirements, and additional data. Drop down boxes are provided to facilitate customer entry of the data. The specific criteria, delivery requirements, and additional data illustrated in FIG. 8 can, of course, vary from the illustrated criteria, delivery requirements, and additional data. Certain fields are designated as required fields, such as aircraft type, engine type, and first delivery month. With the screen shown in FIG. 8, a customer can select any number of aircraft for delivery that meet the criteria and additional data, and the customer can select the number of aircraft desired to be delivered in select delivery months.

Once the customer makes selections as shown in FIG. 8, the customer can then select submit. The system then attempts to identify aircraft in the fleet which match the customer entered data. The matching process is described above. The search results are then displayed as shown in FIG. 9. For each aircraft found in the search, the search results include the aircraft type and series, serial number, date of manufacture, galley type, MTOW, and availability date. The customer is given the option to view the technical specification for the listed aircraft, to view the delivery conditions for the listed aircraft, and to request a term sheet for the listed aircraft.

If the customer selects Technical Specification, then the screen shown in FIG. 10 is displayed for the specific aircraft. The data for the technical specification is pre-stored in the database and provides the customer with additional technical details than displayed with the inquiry results. The technical specifications can be printed from the screen and saved by the customer as a word document.

If the customer selects Delivery Condition, then the screen shown in FIG. 11 is displayed for the specific aircraft. For used aircraft, the delivery conditions typically are based on the contract re-delivery requirements of an existing lease. The data for the delivery conditions is pre-stored in the database and provides the customer with additional delivery details than displayed with the inquiry results. The delivery conditions can be printed from the screen and saved by the customer as a word document.

If the customer selects Request Term Sheet, then a technical requirements screen is displayed by the system ads a pop-up screen, or sub-window. An exemplary technical requirements screen is shown in FIG. 12. As shown in FIG. 12, a customer can confirm the data for the required fields, and can make desired changes. The customer can also identify other issues in the additional comments box. Once the customer has reviewed the required field information and made additional comments, if needed, the customer can then select "Ok", "Reset", or "Cancel". If the customer selects cancel, then the system returns to displaying the inquiry results. If the customer selects reset, then the technical requirements specified on the screen in FIG. 12 are cleared and the customer can make new selections. If the customer selects Ok, then processing proceeds so that the screen illustrated in FIG. 13 is displayed by the system.

As shown in FIG. 13, the customer is prompted to review the customer information to verify that the information is correct. The data displayed on this screen is pre-stored in the system database. The customer can make changes to the data, and then selects "Submit Request". The customer can then exit the site, or perform further transactions by making the appropriate selection on the navigation bar.

Upon receipt of the "Submit Request", the system sends emails to a technical project manager for comment on feasibility, lead times and cost estimate for additional technical requirements, to a marketing executive detailing the request (includes the customer details, search criteria and the aircraft returned in response to that search), and a fleet manager for the allocation decision, and to the customer acknowledging the inquiry, assigning a transaction number to the term sheet request, and confirming that a response would be issued within a specified time frame.

Figure 14:
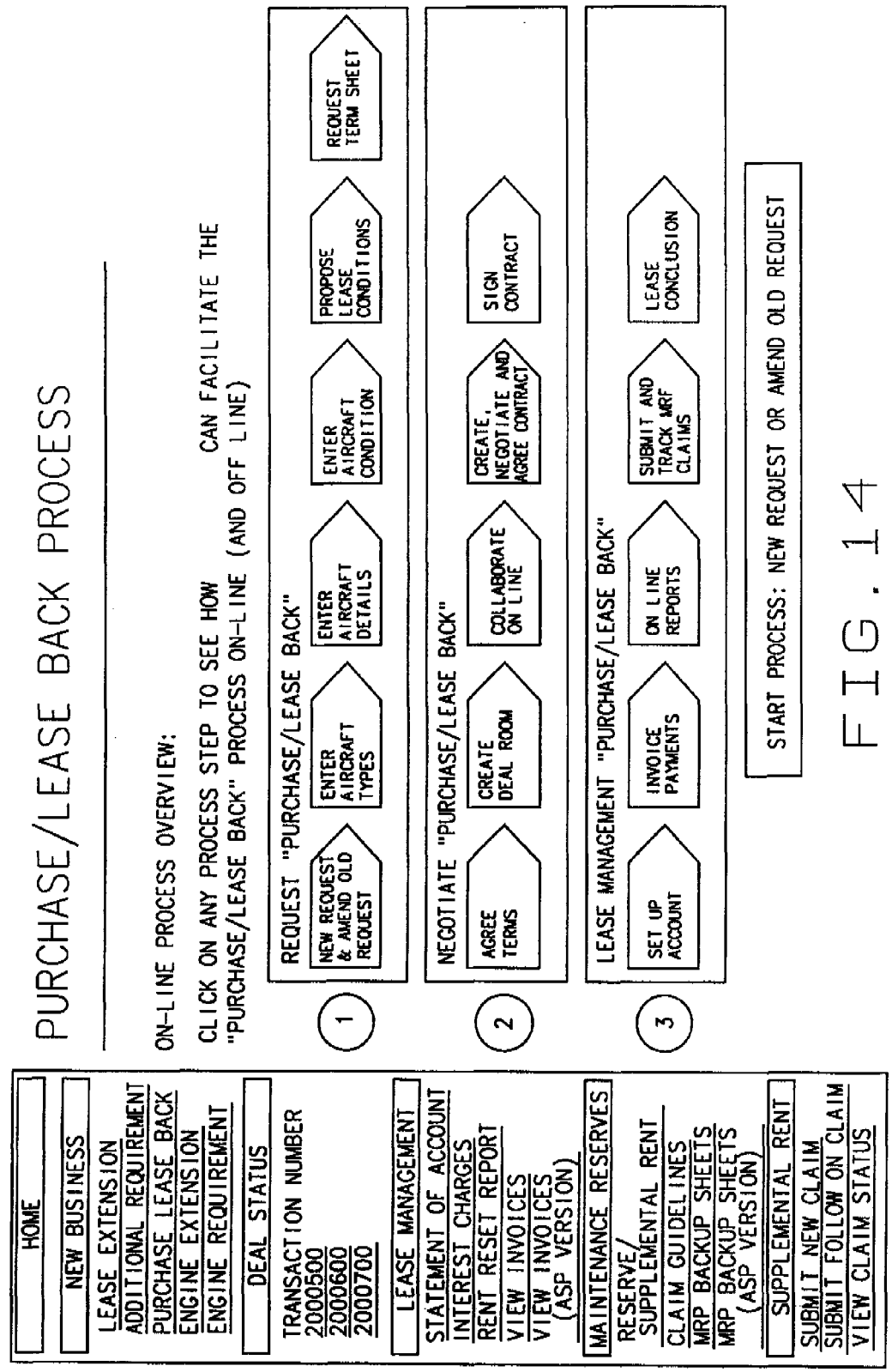
FIG. 14 is an exemplary screen shot illustrating the purchase/lease back process.

FIG. 14 is an exemplary screen shot illustrating the purchase/lease back process. At the illustrated page, a process map is shown which contains hyperlinks to the other steps in the process. Only process steps which have been started or completed have hyperlinks. The process step that the customer is currently on is shown in red and all other process steps are in blue. The customer will be presented with three options.

1. Request New Purchase/Lease Back: If the customer selects this link the system proceeds directly to the screen shot illustrated in FIG. 17 to start the Purchase Lease/Back process.

2. Review/Amend Old Request: The customer can select the link to 'Review/Amend Old Requests' to locate all prior requests. The customer will also be presented with two options to filter searches on this page—time period and request ID number. Time period allows the customer to filter how far back they wish to look for old Purchase/Lease Back requests. Also, the customer will have given an ID number when they made previous requests. Only ID numbers relevant to this customer will be displayed in the drop down box. The customer can select one or more ID numbers using the control key. Once the customer has selected the search options (or not) and clicked on the link, processing proceeds to the screen shot shown in FIG. 16.

3. View Purchase/Lease Back Process: This option takes the customer to a page which has a graphical outline of the Purchase/Lease Back Process.

FIG. 15 is an exemplary screen shot of a page for a new request/amend old request. If the customer selects Purchase/Lease Back on the page illustrated in FIG. 14, the customer is sent to this page. On this page there is a graphical presentation of the high level on line Purchase/Lease Back process. If the customer elects to click on any of the process steps they will be posted to a page which will have a written and graphical representation of what happens both on line and offline at that process step. At the bottom of the page there is a link that takes the customer to the first step of the Purchase/Lease Back process.

FIG. 16 illustrates an exemplary screen shot of a page for displaying search results. The system returns all prior requests that match the customers search selections, and the customer is presented with a high level summary of each request that matches the search parameters.

Request ID Number: This is the ID given to the customer when they either completed a request and requested a term sheet or when they saved a request which had been partially completed.

Asset Types(s): In this box all assets types that were specified in a previous request need to be listed. The asset types are listed by type variant, number e.g., 747-100E x 2, 747-200ER x 3.

Date Request Submitted: This date is the date (GMT) that a Term sheet was requested or a partial request was saved.

At the end of each row a link is provided to the customer that will take the customer to the next step of the process as illustrated in FIG. 17. All fields which are filled in are automatically populated. Below the search results the option to search again, i.e., new search, is provided.

FIG. 17 is an exemplary screen shot of a page for entering aircraft types. On this page the customer defines the types, models and numbers of each aircraft that they would like to Purchase/Lease Back. A yellow warning triangle is provided against fields that have to be completed. If a field is not completed, or incorrectly completed when the customer selects 'submit', a warning box appears informing the customer which field(s) is/are not completed or incorrect. Only when all fields are correct will the customer be allowed to proceed to the next page.

A 'Save Requested Data' is provided at the top of the page. When this is selected, all data the customer has entered is saved. The customer is then taken to the screen illustrated in FIG. 32 where they will be given a ID number which they can use to access the data at another time.

When a customer saves or executes a request, an email is sent to the appropriate marketing representative with the customer details, query no., and all other related information entered in the request page. The email contains a link to the site. This feature can be turned on/off by marketing on a customer-by-customer basis.

The requests submitted by the customer are stored in the database for two reasons. First, to provide the customer an option to re-query on his previous searches and second, to allow tracking of customer requests and behaviour. When the customer clicks on 'Submit', processing proceeds to the screen shown in FIGS. 18 and 19.

Figure 19:
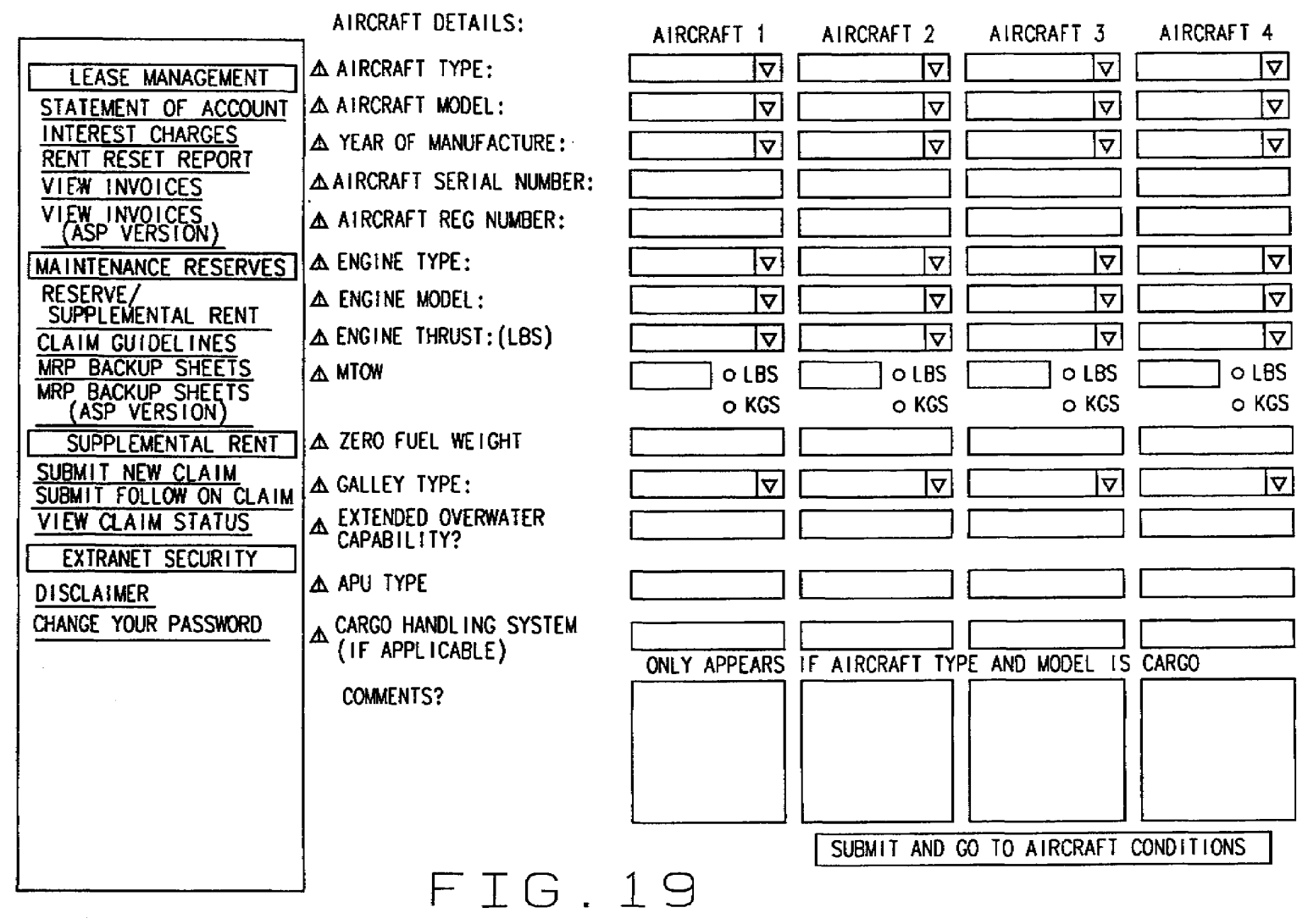

FIGS. 18 and 19 illustrate an exemplary screen shot of a page for entering aircraft details. The number of columns on this screen is defined by the total number of aircraft that the customer wishes to Purchase/Lease Back. The Aircraft Type and Aircraft Model Fields are automatically populated based on the data that the customer previously entered. All fields that have a drop down box have a predefined list of look up data. The customer selects from the list. When the customer clicks on 'Submit And Go To Aircraft Conditions', processing proceeds to the screen shot shown in FIGS. 20, 21 and 22.

Figure 21:
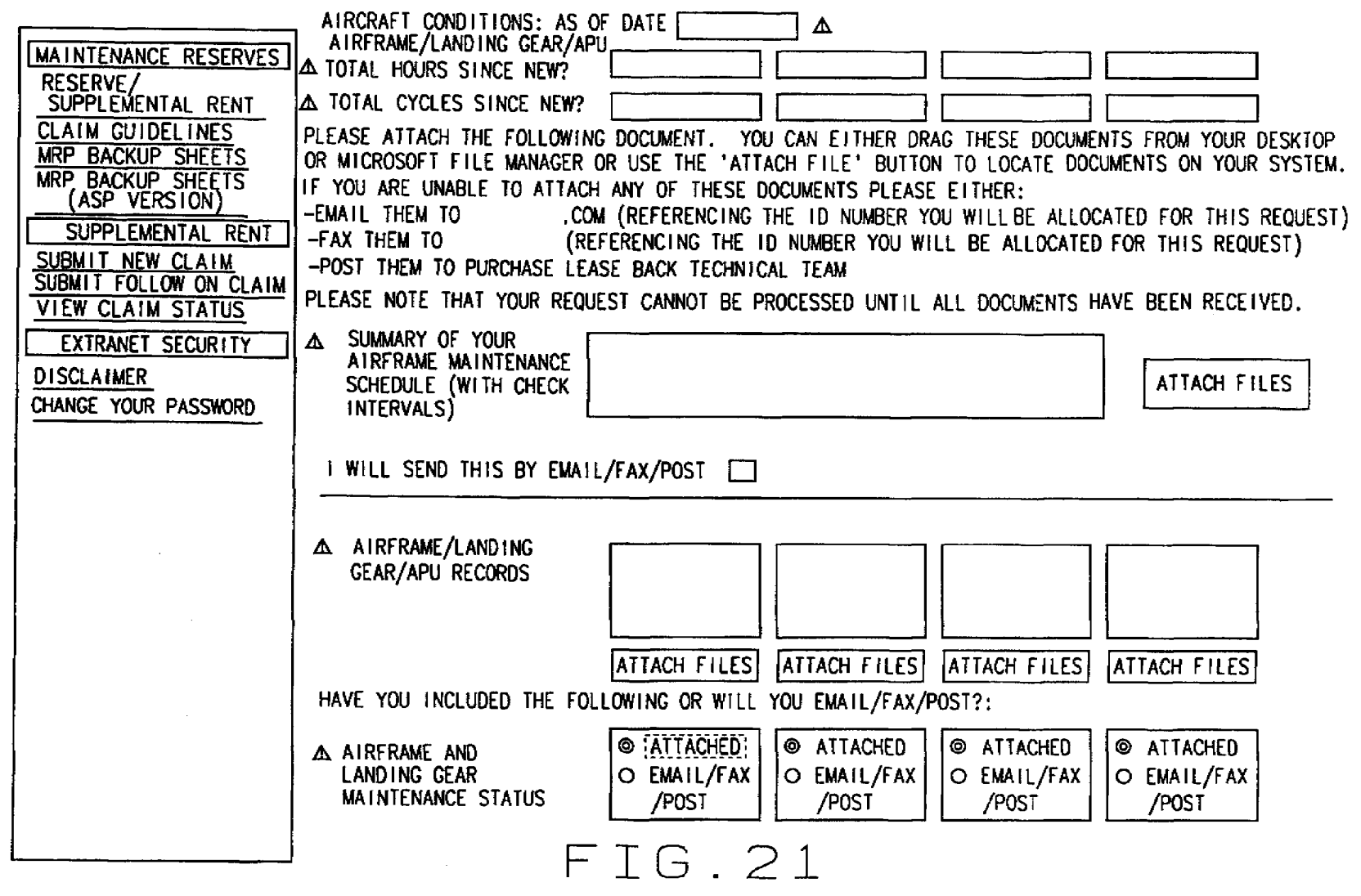

FIGS. 20, 21 and 22 illustrate an exemplary screen shot of a page for entering aircraft conditions. The number of columns on this screen is defined by the total number of aircraft that the customer wishes to Purchase/Lease Back. The Aircraft Data Fields is automatically populated based on the data that the customer previously entered. With respect to the conditions date, the customer can enter a date in to indicate when the conditions data is valid. The customer then has the option to attach various files which detail the aircraft technical specifications and conditions. An 'Attach File' button is provided which allows the customer to browse their computer for files.

Below the fields to add files are checklists for the customer to state whether they have attached the appropriate documents. The customer selects one of the options. Each check box is blank until one is selected. All check boxes which have been checked 'Email/Fax/Post' will cause a record to be created as shown in the screen shot illustrated in FIG. 26 reminding the customer that they have indicated that they will send this file by an alternative means.

Figure 23:
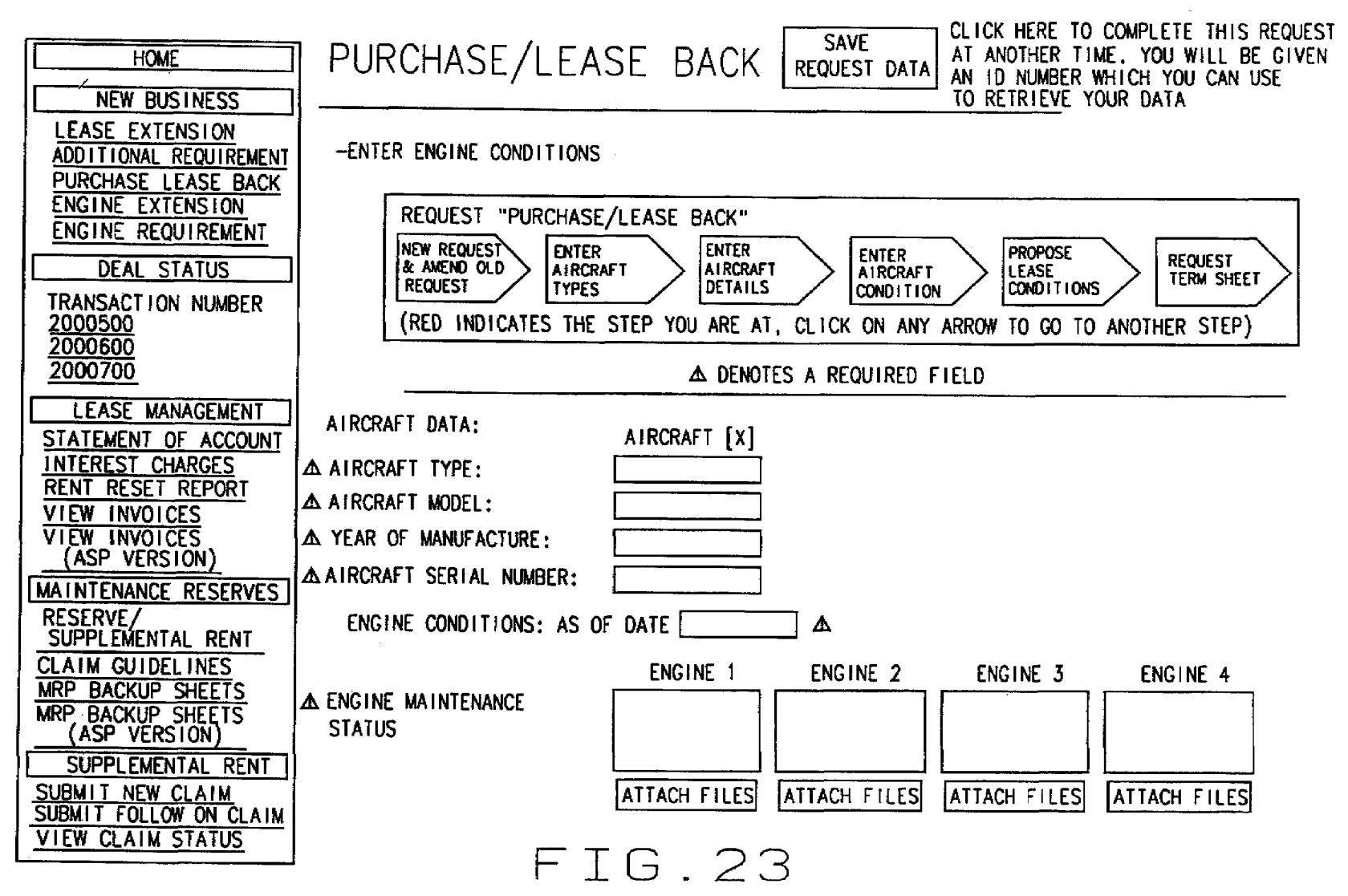

When the customer selects 'Enter Engine Conditions', processing proceeds to the screen shot shown in FIG. 23. When the customer selects 'Submit And Go To Lease Conditions', processing proceeds to the screen shot shown in FIG. 26.

FIGS. 23, 24 and 25 illustrate an exemplary screen shot of a page for entering engine conditions. The Aircraft Data Fields are automatically populated based on the data that the customer previously entered. The Engine Conditions Title has a field next to it for the customer to enter a date in. This date indicates when the conditions data was valid.

The customer then has the option to attach various files which detail the engine technical specifications and conditions. An 'Attach File' button is provided which allows the customer to browse computer for files. Below the fields to add files are checklists for the customer to indicate whether the appropriate documents are attached. All check boxes which have been checked 'Email/Fax/Post' will cause a record to be created reminding the customer that they have indicated that they will send this file by an alternative means. If the customer clicks on 'Submit And Return to Aircraft Conditions', the customer is taken back to the screen shot illustrated in FIGS. 20, 21 and 22.

FIGS. 26, 27 and 28 illustrate an exemplary screen shot of a page for entering proposed lease conditions and to request a term sheet. The number of columns on this screen is defined by the total number of aircraft that the customer wishes to Purchase/Lease Back. The Aircraft Data Fields are automatically populated based on the data that the customer previously entered. For Lessee Financials, customers can drag files from their desktop or file manager or use the 'browse' button opposite to locate files on their system and then download them into this field. Customers should enter data about their revenue, operating income, total liabilities, equity, total assets, market securities, bank lines available and available cash. Similarly, for Fleet Information, customers can drag files from their desktop or file manager or use the 'browse' button opposite to locate files on their system and then download them into this field. When the customer selects 'Request Term Sheet', processing proceeds to the screen shot illustrated in FIGS. 29 and 30.

FIGS. 29 and 30 illustrate an exemplary screen shot of a page for requesting a term sheet. Specifically, on submission of the 'Request Term Sheet', the customer is given an option to confirm contact details and modify the details if required. All these fields are automatically populated form the customer registration database. A transaction number is displayed on this page which the customer can use to access the request at a later date or amend their request. If the customer elects to amend the details, the customer selects 'Edit Contact Details' and processing proceeds to the screen shot illustrated in FIGS. 31 and 32. If the customer is satisfied with the contact details, the customer selects 'Submit Request' and processing returns to an extranet login screen.

Each customer Term Sheet request is stored in the database. An email is sent to the technical project manager for comment on feasibility, lead times and cost estimates, the marketing executive detailing the request including the customer details and request details, and to the customer acknowledging the inquiry, assigning a Transaction Number to their Term Sheet Request, and confirming that a response would be issued within a specified time frame.

FIGS. 31 and 32 illustrate a screen shot of a page for editing contact information. If the customer elects to amend the contact details, such changes can be made on this page. Once the customer is satisfied with the contact details, the customer selects 'Submit Contact details' and processing returns the screen shot illustrated in FIGS. 29 and 30.

During the purchase lease back process, if the customer elects at any time to save their work, the system assigns a reference number to the customer with the customer can use to locate the request at a later date (see FIG. 39). Once the customer elects to exit the extranet, emails are sent to the marketing executive informing them that the customer started the request but did not complete it and gives the ID number and a link to take them to the extranet and appropriate request, and to the customer thanking them for starting the process, confirming the Request ID Number and providing a link back to the extranet.

Exemplary Marketing Executive Viewable Screen Shots

In addition to facilitating customer selection of aircraft and initiation of a lease transaction, the system facilitates management of each customer. Specifically, a marketing executive can access the system to view recent customer activity and take actions to meet the customers needs. The system also facilitates coordination of the many leases that relate to aircraft in an aircraft fleet.

In one specific embodiment, a marketing executive logs onto the site by entering a marketing executive name and password. The login process validates the marketing executive (e.g., matches the login name and password to login names and passwords pre-stored in the database) and only validated marketing executives have access to the portion of the site for reviewing, by customer, availability queries, document generation, and lease management. Based on the marketing executive login, the system enables a particular marketing executive to view specific customer information. For example, marketing executive number 1 may be able to view information relating to customers a, b, and c, and marketing executive number 2 may be able to view information relating to customer x and y.

In the specific exemplary embodiment, and once the marketing executive information is validated, the system displays a customer view screen such as the screen shown in FIG. 33. The marketing executive can select whether to perform functions associated with availability queries, document generation, and lease management. If the marketing executive selects Customer View under Availability Queries, then the marketing executive is prompted to select a customer and to view a query in a specified time period. Drop down menus facilitate selection of the customer and query time period.

Once the marketing executive makes the selections and selects "go", the system searches the database for queries from the specific customer in the selected time period. The queries that meet the selection criteria are then displayed to the marketing executive as shown in FIG. 34. Basic information such as each query number, associated aircraft type, engine type/thrust, EFIS/Non EFIS, lease term and query date are displayed to the marketing executive. By selecting a specific query number, additional details regarding that query are displayed to the marketing executive. Generally, the system enables the marketing executive to view all information regarding each query that was entered by the customer and shown to the customer.

The marketing executive can also select "Full Search" from the "Availability Queries" and, as shown in FIG. 35, the system displays to the marketing executive a screen similar to the "Seek Additional Aircraft" screen (FIG. 8) that is viewable by the customer. In comparison to the screen shown in FIG. 8, the screen shown in FIG. 35 does not includes entries for additional data. The marketing executive can enter aircraft criteria and lease delivery requirements into the system via the screen shown in FIG. 35 and upon selecting submit, the system performs a full search of the entire fleet database to identify potential matches. In the search conducted for this marketing executive, all restrictions are removed so that the marketing executive can view all search results rather than a limited number (e.g., 3) of search results. Using the full search, this marketing executive (e.g., marketing executive) can determine whether all customer needs are being met and whether there is an alternative aircraft that was not shown to the customer that should be presented for consideration by the customer.

The marketing executive can further select "Manage Customer" from the "Availabilities Queries" and, as shown in FIG. 16, the system displays to the marketing executive a screen for a particular customer, or airline. As shown in FIG. 36, certain weights have been assigned to certain aircraft criteria (e.g., Engine Type=6, EFIS=9, Delivery Month=8), and these weights are utilized by the system when determining which aircraft matches to display to the customer. The marketing executive can change the weights assigned to each aircraft criteria via the screen shown in FIG. 36 by entering a new weight or weights and then selecting go. In addition, the marketing executive can change the number of aircraft to be made available for delivery by each customer selected delivery date, as well as the total number of aircraft that can be viewed by the customer as a result of an availability search. The marketing executive can also select (by checking or "unchecking" the indicated box) whether an email is to be sent to the marketing executive upon submission of a term sheet request by the customer. The marketing executive can then select "Save" to apply any changes, "Reset" to clear all the selections on the screen, or "Close" to close the screen without saving any changes that have not been previously saved.

FIG. 37 is an exemplary screen shot of a page for enabling searching of customer requests for purchase lease back transactions. A marketing executive can select the link to 'Review/Amend Old Requests' to locate all prior requests. The marketing executive also is presented with three options to filter searches. Specifically, a search can be conducted by customer name (drop down box), time period (to filter how far back to look for old Purchase/Lease Back requests), and by ID number. If a specific customer is been selected, then only ID numbers relevant to that customer are displayed in the drop down box.

Once the marketing executive has selected the search options (or not) and selected Locate Requests, processing proceeds to the screen shot illustrated in FIG. 38. As shown in FIG. 38, the system returns all prior requests that match the search selections. A high level summary of each request that matches the search parameters is displayed and includes the following.

Request ID Number: This is the ID given to the customer when they either completed a request and requested a Term Sheet or when they saved a request which had been partially completed.

Asset Types(s): In this box all asset types that were specified in a previous request are listed.

Date Request Submitted: This date is the date (GMT) that a Term sheet was requested or a partial request was saved.

At the end of each row, a link is provided to the marketing executive to enable further review of each request. Below the search results, the option to search again, i.e., New Search, is provided.

Figure 39:
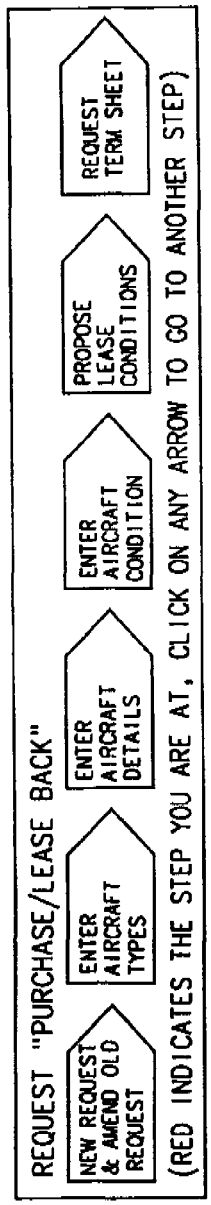
FIG. 39 is an exemplary screen shot of a page for saving partially completed requests.

FIG. 39 is an exemplary screen shot illustrating a page for saving a partially completed request. During the purchase lease back process, if the customer elects at any time to save his work, the system assigns a reference number to the customer with the customer can use to locate the request at a later date.

Figure 40:
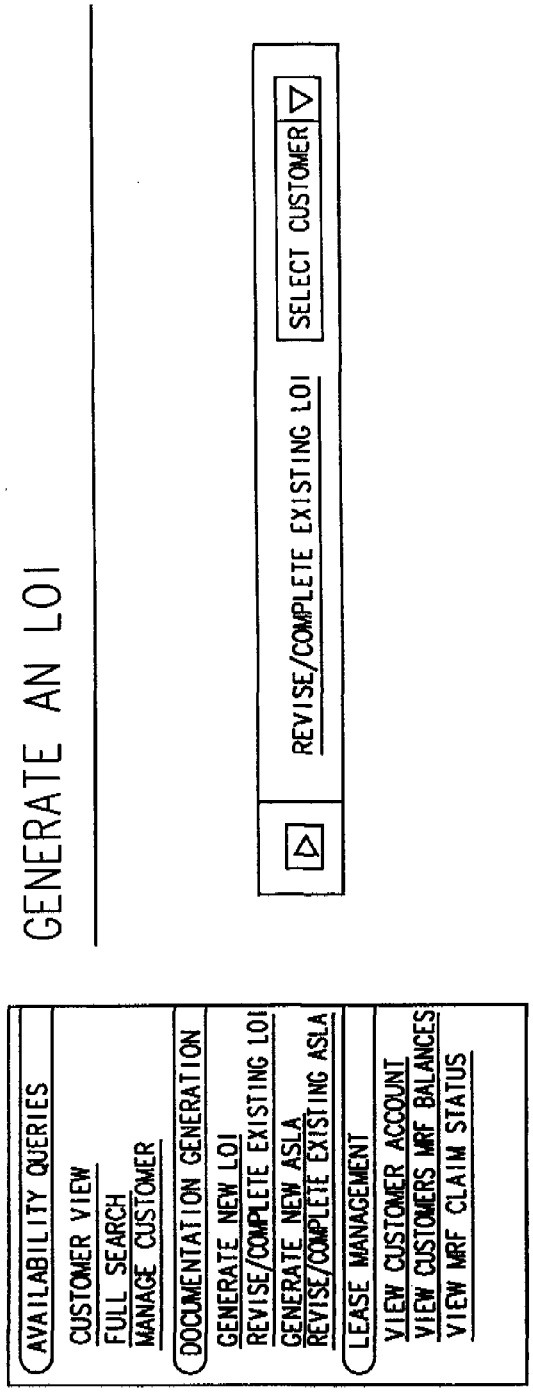
FIG. 40 is an exemplary screen shot of a page for prompting a marketing executive to select a customer for information relating to letters of intent.

In the event that a customer has requested a term sheet, then the marketing executive selects "Generate New LOI" or "Revise/Complete Existing LOI" under "Document Generation" The system then displays a screen such as the screen shown in FIG. 40 to the marketing executive. The marketing executive then selects a particular customer via a drop down menu, and upon receiving the selection, the system displays to the marketing executive the various LOIs or terms sheets for the specific customer, as shown in FIG. 41. The specific LOI or term sheet can then be viewed, and edited, by selecting the corresponding query number.

Similarly, and if a customer has requested an aircraft specific lease agreement (ASLA), then the marketing executive selects "Generate New ASLA" or "Revise/Complete Existing ASLA" under "Document Generation". The system then displays a screen similar to the screen shown in FIG. 40, except for an ASLA rather than an LOI. The marketing executive then selects a particular customer via a drop down menu, and upon receiving the selection, the system displays to the marketing executive the various ASLAs for the specific customer, as shown in FIG. 42. The specific ASLA can then be viewed, and edited, by selecting the corresponding query number.

Exemplary Displays for a Deal Management Sub-System

To generate terms sheets, letters of intent, and ASLAs, and in one specific exemplary embodiment, the system includes a deal management sub-system. The deal management sub-system is a windows-based system that includes document templates populated from data stored in the database. More particularly, once a marketing executive selects a particular deal for which a document is to be generated, the sub-system creates an answer file by collecting the necessary information for the data previously input to the database by the customer and the marketing executive. The data is collected into one answer file by simply scanning the previously entered data looking for matches to data designations in the answer file. For example, when the customer inputs data for a particular aircraft identifier, a designation is associated with the input and that designation corresponds to a designation in the answer file for term sheets, letters of intent, and ASLAs. When the marketing executive generates a term sheet, then the sub-system scans the customer and marketing executive entered data for the designations required to populate the answer file for the particular document.

Once the answer file is generated, the subsystem then displays to the marketing executive the template of the document being generated, and sequences through each part of the document where an input from the answer file is generated. The sub-system displays to the marketing executive the suggested input from the answer file, and the marketing executive can either approve insertion of the input from the answer file or provide a different input.

Figure 43:
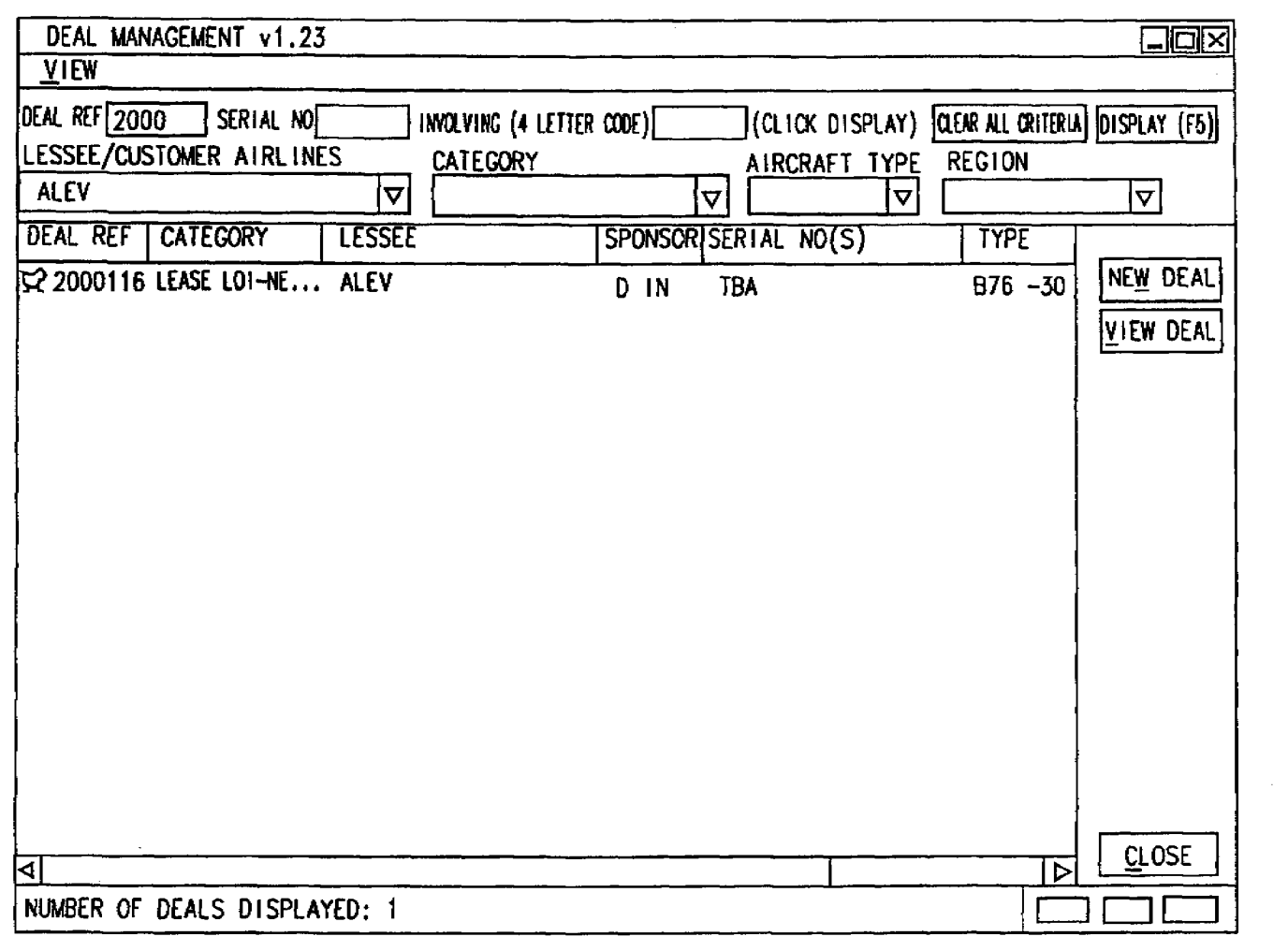

In one specific embodiment, and after a marketing executive has logged into the system and has selected a particular customer, a window such as the window illustrated in FIG. 43 is displayed to the marketing executive. To view a deal, the marketing executive can input a deal reference number (e.g., the query number) as well as select a particular customer (lessee/customer/airlines) from a drop down menu. A listing of deals for the particular customer including at least a portion of the deal reference number in its designation is then displayed to the marketing executive, i.e., the deal sub-system searches the database for matches to the input data and displays the search results in the window. The marketing executive can then select "View Deal" to view the data related to the designated deal. The marketing executive can also select "New Deal" to create a new deal folder.

If the marketing executive select "View Deal", then a window such as the window shown in FIG. 44 is displayed. The marketing executive can view lessee details (e.g., trading name, code, registered name, country, address), rental data, or MRF Rates. The marketing executive can then also select "Generate TS" to initiate generation of a term sheet, "Generate ASLA" to initiate generation of an ASLA, "Open Document" to open an existing draft of a document, "Publish Document" to post the document to a Quickplace location, or "Goto Quickplace" to link to a Quickplace address corresponding the particular customer. The term Quickplace refers to a commercially available software package from Lotus Development Corporation, 55 Cambridge Parkway, Cambridge, Mass. 02142, that enables posting documents on a secure extranet site so that the document can be viewed by both the customer as well as the marketing executive.

If the marketing executive selects "Generate LOI", then the LOI template is displayed to the marketing executive and a pop-up window containing data for a currently selected location in the LOI is displayed as shown in FIG. 45. An exemplary LOI template is set forth in Appendix 2. Of course, the specific form and terms of an LOI can vary from the form and terms illustrated in Appendix 2. The system sequences through each blank in the template LOI making suggestions at each location for input from the answer file. The marketing executive makes selections and populates the LOI. In addition to populating fields, paragraphs are inserted or removed depending on the particular deal (e.g., new or used aircraft). Once all terms in the LOI have been completed, or if the marketing executive is interrupted and is not able to complete the LOI in one session, the marketing executive saves the partially or fully populated LOI to the database. A process identical to the process for populating the LOI template is performed for an ASLA except that an ASLA template is used in place of the LOI template.

Once the document is saved, the document can be posted to a secure extranet site using the Quickplace tool described above. Specifically, the marketing executive simply returns to the deal details windows, selects a document, and selects publish document. The system then posts the document to a designated extranet address.

Both the customer and the marketing executive can then view the document, and information related to the document, via the Quickplace tool. For example, and referring to FIG. 46, both the customer and marketing executive can view current as well as older drafts of an LOI and the ASLA. The author and modification date also are displayed on the contract room screen. The Quickplace tool also tracks tasks to be performed as illustrated in FIG. 47, including displaying priority, start date, due date, and who is assigned to perform the task. A calendar can also be invoked within the Quickplace tool so that both the customer and marketing executive can view a calendar depiction of tasks to be performed and dates on which the tasks are to be completed, as shown in FIG. 48.

The system described above facilitates meeting customer needs for a fleet of aircraft, and well as coordinating numerous aircraft leases. The system also facilitates managing leases for a fleet of aircraft including having new leases in place upon expiration of a then current lease. Further, a customer can readily select, via the system, multiple aircraft desired for lease without requiring involving a marketing executive, and such selections can be made the customer any time, anywhere, at the customer's convenience. The system also facilitates efficient and uniform generation of term sheets, letters of intent, and lease contracts.

While the system is described above in the context of aircraft, the system can be used in connection with many other types of equipment. For other equipment, the screens would be modified to designate criteria and other information relevant to a particular lease document (e.g., term sheet, letter of intent, ASLA) to be generated. Just by way of example, and to illustrate one such modification, the system can be modified for the lease of aircraft engines.

More specifically, FIG. 49 is an exemplary screen shot of a home page for a deal room relating to aircraft engine leases. As with the aircraft lease deal room home page, each customer has a custom home page that displays the name of the particular authorized individual and customer name. Once the customer logs into the system, the system displays the deal room screen shown in FIG. 49. The customer can then select specific proposals, deals, account status information, and maintenance reserves to view. Additionally, the customer can link to related sites or view extranet security features.

If the customer select "Extend Existing Engine" under "Request a Proposal", then the screen shown in FIG. 50 is displayed. Specifically, the customer is presented with a screen listing the customer existing engines under lease with current lease termination dates for each aircraft. Each engine listing includes a drop down box (New Expiry Date) which allows the customer to enter the new desired lease termination date. The customer can also select "Request Extension Term Sheet".

If, at the deal room page illustrated in FIG. 49, the customer selects "Seek Additional Engines", then the screen shown in FIG. 51 is displayed to the customer. This screen enables the customer to enter, or specify, engine criteria, lease delivery requirements, and additional data. Drop down boxes are provided to facilitate customer entry of the data. The specific criteria, delivery requirements, and additional data illustrated in FIG. 51 can, of course, vary from the illustrated criteria, delivery requirements, and additional data. Certain fields also can be designated as required fields, such as engine type, engine thrust, QEC configuration, fire warning harness configuration, lease term, first lease start date, annual utilization, and hour to cycle ratio.

Once the customer makes selections as shown in FIG. 51, the customer can then select submit. The system then attempts to identify aircraft engines in the fleet which match the customer entered data. The system returns to the customer those engines which most closely match the search criteria entered. Only an exact match on engine type and thrust is required for an engine to be returned. All searches made by the customer are stored in the database. Also, when a customer executes a search, an email is sent to the appropriate representative with the customer details, query number, and other related information entered in the search page. The path of the e-mail is determined by the term of the lease request. For example, if the request is for a period of less than one year, an e-mail is sent to a leasing agent and the customer support representative. If the request is for a period of greater than one year, an e-mail is sent to marketing. If the request is for an unknown duration, an e-mail is sent to a customer support representative.

The following rules are applied when evaluating search criteria.

1. For engines not on dedicated long term lease, only engines made available by operations management are returned by the search. All long-term leased engines are listed if matching availability within one month of customer request. If the exact match is not available in the specified delivery date, matches in nearest available months are displayed.

2. For each engine which is visible on the extranet a country may be identified into which that engine may not be leased. One such country can be identified per engine.

3. For each engine, a tax based restriction may be specified. One such restriction can be specified per engine. The restriction takes the form of a geographical region, e.g., North America, Europe.

4. Minimum thrust drives engine listings. Any engine with the required minimum thrust will be listed.

5. Any engine located near the designated installation location will be listed first.

6. If no engine matches are returned, a message will be displayed stating that an engine can be sourced from a third party if the customer would like such a service.

7. All engines matching the requested availability date are listed. The listing order is driven by the match to the other criteria based upon the weightings.

8. Any customer not filling in a mandatory field will still be shown the full availability, but will not be allowed to request a term sheet without such mandatory field.

The search criteria will be matched against the availability listing in the following way. Specifically, only engines marked as available on the extranet will be considered. Also, selected engines must be of the same type and series as specified by the customer. All matches are shown for each delivery date specified. Where the customer country of operation matches the excluded country specified for an engine that engine would not be returned to the customer. A weighting system is used to match the selection criteria and the available engine. The weighting system takes into account the number of criteria which an engine matches and the relative importance of each criteria. If the tax based restriction comes into effect for a particular engine, the effect will be to give that engine a weighting which will put it last on the list of engines to be offered to the customer.

The search results are then displayed as shown in FIG. 52. For each aircraft engine found in the search, the search results include the engine type, engine thrust, QEC configuration, TSL SV, ETOPS, LLP limiter, availability, and housekeeping location. The customer is given the option to view the airworthiness tag, LLP description, and AD status, and to request a term sheet for the listed engine.

Each customer Term Sheet request will be stored in the database. An email is sent to the following.

1. Marketing and/or leasing agent and customer support representative depending on the lease term. This email includes the customer details, search criteria and the engine returned in response to that search.

2. The customer acknowledging their inquiry, assigning a transaction number to the term sheet request and confirming that a response would be issued within a specified time frame.

The customer may also make further comments/clarifications in a comment box when they are requesting a term sheet.

FIG. 53 illustrates an exemplary screen shot displayed if a customer requests a term sheet. On submission of the request for Term Sheet, the customer is given an option to confirm his contact details and modify the contact details if required. On submitting the request, the information is stored in the database and also sends an automated email to the marketing executive requesting a term sheet with the complete information as entered in the search page.

In addition to facilitating customer selection of engines and initiation of a lease transaction, the system facilitates management of each customer. Specifically, a marketing executive can access the system to view recent customer activity and take actions to meet the customer needs, as with the aircraft process described above. The system also facilitates coordination of the many leases that relate to aircraft engines.

As with the aircraft process described above, and in one specific embodiment of the engine lease system, a marketing executive logs onto the site by entering a marketing executive name and password. The login process validates the marketing executive (e.g., matches the login name and password to login names and passwords pre-stored in the database) and only validated marketing executives have access to the portion of the site for reviewing, by customer, availability queries, document generation, and lease management. Based on the marketing executive login, the system enables a particular marketing executive to view specific customer information.

Figure 54:
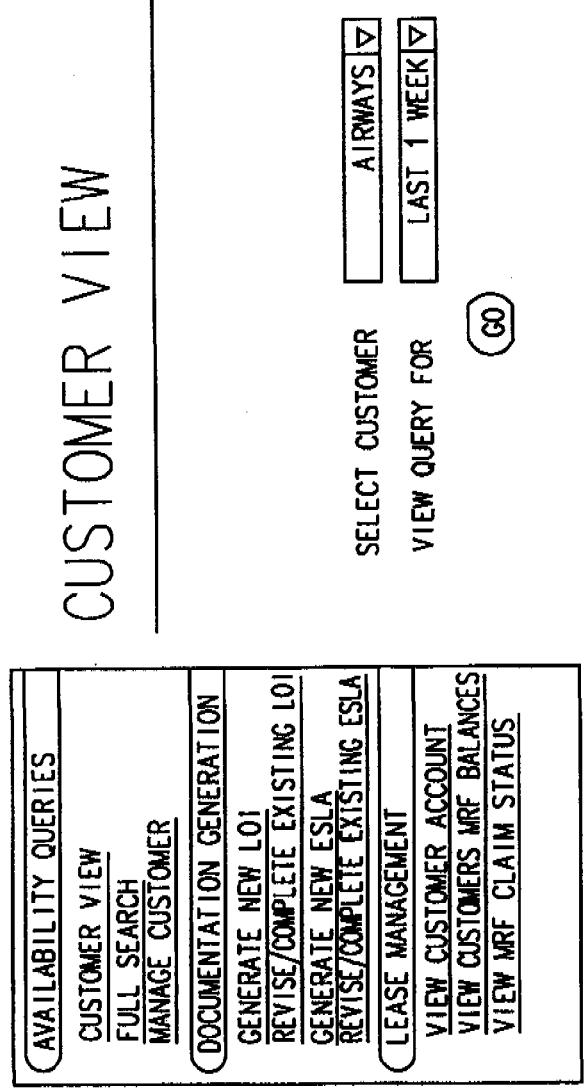
FIG. 54 is an exemplary screen shot of a page for selecting customer information to view.
Figure 55:
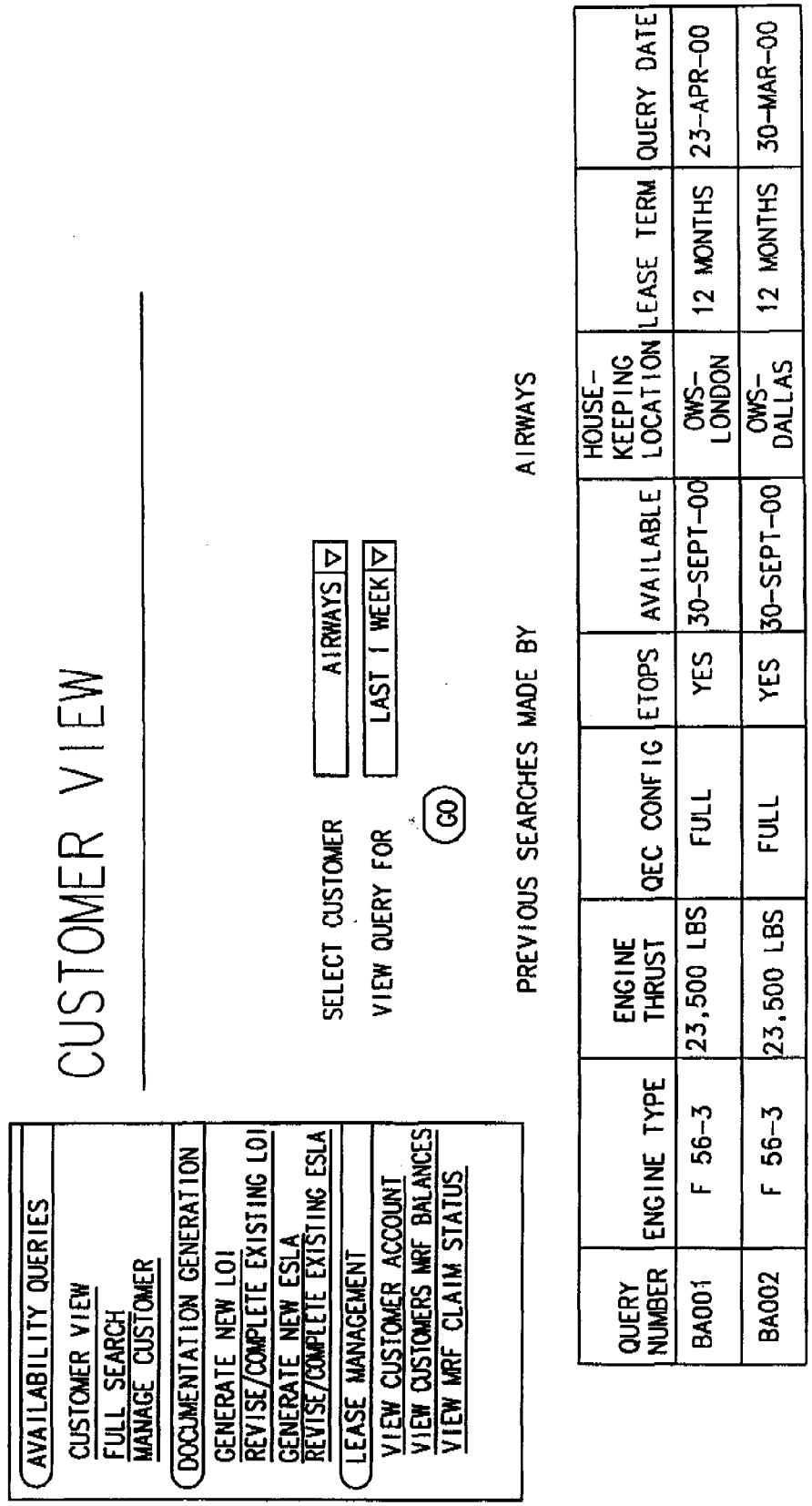
FIG. 55 is an exemplary screen shot of a page for displaying search results from the search request specified on the page illustrated in FIG. 54.

In the specific exemplary embodiment, and once the marketing executive information is validated, the system displays to a marketing executive a customer view screen as shown in FIG. 54. The marketing executive can select whether to perform functions associated with availability queries, document generation, and lease management. The marketing executive can select, for example, a particular customer and time period to be searched, and then select "go". The system then returns to the marketing executive the search results in the form illustrated in FIG. 55.

If the marketing executive selects "Full Search" from the "Availability Queries", the system displays to the marketing executive a screen such as the screen illustrated in FIG. 56. The marketing executive can enter engine criteria and lease delivery requirements into the system via the screen shown in FIG. 56 and upon selecting submit, the system performs a full search of the entire fleet database to identify potential matches.

FIG. 57 is an exemplary screen shot of a page for a marketing executive to utilize in managing a customer which enables the marketing executive to rank the importance of various search criteria, thus changing the order of the engines displayed to the customer. The processes, e.g., deal management sub-system processes, for generating an LOI and for generating an engine specific lease agreement (ESLA) are the same as described above with respect to generating an LOI and generating an ASLA for aircraft. In addition, the parties can collaborate using the Quickplace tool and processes as described above with respect to aircraft.

The illustration of modifying the system for an aircraft engine as compared to an aircraft is exemplary only, and the system can be modified for many other types of equipment, including ships, rail cars, locomotives, vehicles, and containers. The system facilitates meeting both customer needs and efficient management of equipment leases.

While the invention has been described in terms of various specific embodiments, those skilled in the art will recognize that the invention can be practiced with modification within the spirit and scope of the claims.

What is claimed is:

1. A method for operating a computer to facilitate a lease transaction involving an aircraft between a lessor and a customer, said method comprising the steps of:

providing a database for storing information relating to a plurality of aircraft for lease including specifications for each aircraft and, if the aircraft is currently being leased, the terms of the lease;

prompting the customer to select a lease transaction type for a specific type of aircraft to be leased;

prompting the customer to provide information required to generate at least one document for the selected lease transaction type, the customer provided information includes criteria of the aircraft and additional lease requirements including an aircraft type, an aircraft series, and an amount of engine thrust desired from the aircraft;

matching the customer provided information with the aircraft information stored within the database by applying predetermined search rules including:

a first rule wherein only aircraft selected as being available by the lessor are returned by a search, if the exact match is not available for a specified delivery date, matches in nearest available months are displayed;

a second rule wherein for each aircraft viewable by the customer, at least one of a country and region may be identified into which that aircraft may not be leased;

a third rule wherein for each aircraft, a tax based restriction may be specified, the tax based restriction includes a geographical region;

a fourth rule wherein aircraft engines are retrieved based on a minimum engine thrust amount; and a fifth rule wherein aircraft are retrieved based on an aircraft weight;

displaying search results including each aircraft matching the customer provided information;

selecting by the customer an aircraft from the displayed search results;

modifying by the lessor the customer provided information to generate the at least one document;

generating the at least one document using the modified customer provided information and the customer selected aircraft, the at least one document including terms and conditions proposed by the lessor to the customer for leasing the customer selected aircraft to the customer by the lessor;

posting the generated document such that the customer and the lessor can view the document and document data, document data is information relating to the generation of the document including historical drafts of the document, each author of the historical drafts, and modification dates; and tracking tasks to be performed, dates for performance, and parties responsible for performing the tasks as set forth in terms and conditions of the generated document including at least one of inspecting the customer selected aircraft, signing the generated document, and meeting regarding the lease transaction.

2. A method according to claim 1 wherein prompting a customer to select a lease transaction type comprises the step of displaying a computer generated screen listing a plurality of lease transaction type selections.

3. A method according to claim 2 wherein said lease transaction type selections comprise at least one of a lease extension, a lease, and a purchase lease back agreement.

4. A method according to claim 3 wherein for a lease extension, prompting the customer to provide information required to generate at least one document comprises the step of displaying information related to at least one lease to the customer.

5. A method according to claim 1 wherein selecting by the customer an aircraft from the displayed search results further comprises:

automatically transmitting data relating to the aircraft selected by the customer to a technical project manager for the lessor, a fleet manager for the lessor, and a marketing executive for the lessor;

prompting the technical project manager to submit comments to the marketing executive regarding the aircraft selected by the customer including feasibility of supplying the selected aircraft, lead times for supplying the selected aircraft, and cost estimates for additional technical requirements; and prompting the fleet manager to submit an allocation decision to the marketing executive regarding the aircraft selected by the customer.

6. A method according to claim 1 further comprising the steps of searching a database to identify aircraft which match the criteria supplied by the customer in response to prompting the customer to provide information required to generate at least one document, and displaying to the customer at least some information relating to at least some of the aircraft identified as a match from the database search.

7. A method according to claim 6 wherein a customer is prompted to select at least one of the identified aircraft, and wherein generating the document comprises the step of populating the selected document type with data related to the one identified aircraft.

8. A computer for facilitating a lease transaction involving an aircraft between a lessor and a customer, the computer programmed to:

store, in a database, information relating to a plurality of aircraft for lease including specifications for each aircraft and, if the aircraft is currently being leased, the terms of the lease;

prompt the customer to select a type of lease transaction for a specific type of aircraft to be leased;

prompt the customer to provide information required to generate at least one document for the selected lease transaction type, the customer provided information includes criteria of the aircraft and additional lease requirements including an aircraft type, an aircraft series, and an amount of engine thrust desired from the aircraft;

match the customer provided information with the aircraft information stored within the database by applying predetermined search rules including:

a first rule wherein only aircraft selected as being available by the lessor are returned by a search, if the exact match is not available for a specified delivery date, matches in nearest available months are displayed;

a second rule wherein for each aircraft viewable by the customer, at least one of a country and region may be identified into which that aircraft may not be leased;

a third rule wherein for each aircraft, a tax based restriction may be specified, the tax based restriction includes a geographical region;

a fourth rule wherein aircraft engines are retrieved based on a minimum engine thrust amount; and a fifth rule wherein aircraft are retrieved based on an aircraft weight;

display search results including each aircraft matching the customer provided information;

prompt the customer to select an aircraft from the displayed search results;

enable the lessor to modify the customer provided information to generate the at least one document;

generate the at least one document using the modified customer provided information and the customer selected aircraft, the at least one document including terms and conditions proposed by the lessor to the customer for leasing the customer selected aircraft to the customer by the lessor;

post the generated document such that the customer and the lessor can view the document and document data, document data is information relating to the generation of the document including historical drafts of the document, each author of the historical drafts, and modification dates; and track tasks to be performed, dates for performance, and parties responsible for performing the tasks as set forth in terms and conditions of the generated document including at least one of inspecting the customer selected aircraft, signing the generated document, and meeting regarding the lease transaction.

9. A computer according to claim 8 wherein to prompt a customer to select a type of lease transaction, said computer displays a computer generated screen listing a plurality of lease transaction type selections.

10. A computer according to claim 9 wherein said document type selections comprise at least one of a lease extension, a lease, and a sale and lease back agreement.

11. A computer according to claim 10 wherein for a lease extension, said computer displays, to the customer, information related to at least one lease.

12. A computer according to claim 8 wherein after the customer selects an aircraft from the displayed search results, the computer is programmed to:
   automatically transmit data relating to the aircraft selected by the customer to a technical project manager for the lessor, a fleet manager for the lessor, and a marketing executive for the lessor;
   prompt the technical project manager to transmit comments to the marketing executive regarding the aircraft selected by the customer including feasibility of supplying the selected aircraft, lead times for supplying the selected aircraft, and cost estimates for additional technical requirements; and
   prompt the fleet manager to transmit an allocation decision to the marketing executive regarding the aircraft selected by the customer.

13. A computer according to claim 8 further programmed to search a database to identify aircraft which match the criteria supplied by the customer in response to prompting the customer to provide information required to generate the at least one document, and to display to the customer at least some information relating to at least some of the aircraft identified as a match from the database search.

14. A computer according to claim 13 further programmed to prompt a customer to select at least one of the identified aircraft, and wherein to generate the at least one document, said computer populates the document with data related to the one identified equipment.

15. A system for generating lease documents for leasing an aircraft between a lessor and a customer, said system comprising:
   a database comprising information relating to a plurality of aircraft for lease including specifications for each aircraft and, if the aircraft is currently being leased, the database including the terms of the lease; and
   a server configured to:
      prompt the customer to provide information required to generate a document for a selected lease transaction type, the customer provided information includes criteria of an aircraft and additional lease requirements including an aircraft type, an aircraft series, and an amount of engine thrust desired from the aircraft;
      match the customer provided information with the aircraft information by applying predetermined search rules including:
         a first rule wherein only aircraft selected as being available by the lessor are returned by a search, if the exact match is not available for a specified delivery date, matches in nearest available months are displayed,
         a second rule wherein for each aircraft viewable by the customer, at least one of a country and region may be identified into which that aircraft may not be leased;
         a third rule wherein for each aircraft, a tax based restriction may be specified, the tax based restriction includes a geographical region;
         a fourth rule wherein aircraft engines are retrieved based on a minimum engine thrust amount; and
         a fifth rule wherein aircraft are retrieved based on an aircraft weight,
      display search results including each aircraft matching the customer provided information;
      prompt the customer to select an aircraft from the displayed search results;
      prompt the lessor to select a type of document to be generated and to provide information required to generate the selected document type;
      enable the lessor to modify the customer provided information to generate the document;
      generate the at least one document using the modified customer provided information and the customer selected aircraft, the at least one document including terms and conditions proposed by the lessor to the customer for leasing the customer selected aircraft to the customer by the lessor;
      post the generated document such that the customer and the lessor can view the document and document data, document data is information relating to the generation of the document including historical drafts of the document, each author of the historical drafts, and modification dates; and
      track tasks to be performed, dates for performance, and parties responsible for performing the tasks as set forth in terms and conditions of the generated document including at least one of inspecting the customer selected aircraft, signing the generated document, and meeting regarding the lease transaction.

16. A system according to claim 15 wherein said database further comprises at least one of data corresponding to an availability query submitted by the lessor including a marketing executive and related to a lease transaction, data corresponding to search results from execution of the availability query, data corresponding to a marketing executive desired aircraft configuration, and data corresponding to availability of aircraft for lease.

17. A system according to claim 15 wherein said server is configured to cause a screen listing a plurality of transaction type selections to be displayed at a client computer.

18. A system according to claim 17 wherein said transaction type selections comprise at least one of a lease extension, a lease, and a purchase lease back agreement.

19. A system according to claim 17 wherein for a lease extension, said server causes said client computer to display information related to at least one lease.

20. A system according to claim 15 wherein after the customer selects an aircraft from the displayed search results, the server is configured to:
   automatically transmit data relating to the aircraft selected by the customer to a technical project manager for the lessor, a fleet manager for the lessor, and a marketing executive for the lessor;
   prompt the technical project manager to transmit comments to the marketing executive regarding the aircraft selected by the customer including feasibility of supplying the selected aircraft, lead times for supplying the selected aircraft, and cost estimates for additional technical requirements; and
   prompt the fleet manager to transmit an allocation decision to the marketing executive regarding the aircraft selected by the customer.

21. A system according to claim 15 wherein said server is configured to cause said database to be searched to identify aircraft which match criteria supplied in response to prompting the lessor including a marketing executive to provide information required to generate the selected document type, and to display at a client computer at least some information relating to at least some of the aircraft identified as a match from the database search.

22. A system according to claim 21 wherein said server is further configured to prompt the marketing executive to select at least one of the identified aircraft, and wherein to generate the selected document type using the customer provided information, said server is configured to populate the selected document type with data related to the one identified aircraft.

23. A method for initiating a lease transaction involving an aircraft between a lessor and a customer, said method comprising the steps of:

prompting the customer to select a type of lease transaction for a specific type of aircraft to be leased;

prompting the customer to provide information regarding aircraft to be subject to the lease transaction, the customer provided information includes criteria of the aircraft and additional lease requirements including an aircraft type, an aircraft series, and an amount of engine thrust desired from the aircraft;

prompting the customer to request generation of a term sheet for the lease transaction;

matching the customer provided information with aircraft information by applying predetermined search rules, the aircraft information including specifications for a plurality of aircraft and, if an aircraft is currently being leased, the terms of the lease, the predetermined search rules including:

a first rule wherein only aircraft selected as being available by the lessor are returned by a search, if the exact match is not available for a specified delivery date, matches in nearest available months are displayed;

a second rule wherein for each aircraft viewable by the customer, at least one of a country and region may be identified into which that aircraft may not be leased;

a third rule wherein for each aircraft, a tax based restriction may be specified, the tax based restriction includes a geographical region;

a fourth rule wherein aircraft engines are retrieved based on a minimum engine thrust amount; and a fifth rule wherein aircraft are retrieved based on an aircraft weight;

displaying search results including each aircraft matching the customer provided information;

selecting by the customer an aircraft from the displayed search results;

modifying by the lessor the customer provided information for generating the term sheet;

generating the term sheet using the modified customer provided information and the customer selected aircraft, the term sheet including terms and conditions proposed by the lessor to the customer for leasing the customer selected aircraft to the customer by the lessor;

posting the generated term sheet such that the customer and the lessor can view the term sheet and document data, document data is information relating to the generation of the term sheet including historical drafts of the term sheet, each author of the historical drafts, and modification dates; and tracking tasks to be performed, dates for performance, and parties responsible for performing the tasks as set forth in terms and conditions of the generated term sheet including at least one of inspecting the customer selected aircraft, signing the term sheet, and meeting regarding the lease transaction.

24. A method according to claim 23 wherein prompting a customer to select a type of lease transaction comprises the step of displaying a computer generated screen listing a plurality of lease transaction type selections.

25. A method according to claim 24 wherein said lease transaction type selections comprise at least one of a lease extension, a lease, and a purchase lease back agreement.

26. A method according to claim 25 wherein for a lease extension, prompting the customer to provide information regarding aircraft to be subject to the lease transaction comprises the step of displaying information related to at least one lease to the customer.

27. A method according to claim 23 wherein selecting by the customer an aircraft from the displayed search results further comprises:

automatically transmitting data relating to the aircraft selected by the customer to a technical project manager for the lessor, a fleet manager for the lessor, and a marketing executive for the lessor;

prompting the technical project manager to submit comments to the marketing executive regarding the aircraft selected by the customer including feasibility of supplying the selected aircraft, lead times for supplying the selected aircraft, and cost estimates for additional technical requirements; and prompting the fleet manager to submit an allocation decision to the marketing executive regarding the aircraft selected by the customer.

28. A method according to claim 23 further comprising the steps of searching a database to identify aircraft which match the aircraft criteria supplied by the customer in response to prompting the customer to provide information regarding the aircraft to be subject to the lease transaction, and displaying to the customer at least some information relating to at least some of the aircraft identified from the database search.

29. A method according to claim 28 wherein a customer is prompted to select at least one of the identified aircraft, and further comprising the step of generating a term sheet using the customer provided information.

30. A method for initiating a lease transaction involving an aircraft between a lessor and a customer, said method comprising the steps of:

providing a database for storing information relating to a plurality of aircraft for lease including specifications for each aircraft and, if the aircraft is currently being leased, the terms of the lease;

selecting, by the customer, from an electronic interface, a lease transaction type for a specific type of aircraft to be leased;

identifying, by the customer, from the electronic interface, information including criteria of aircraft desired to be subject to the lease and additional lease requirements including an aircraft type, an aircraft series, and an amount of engine thrust desired from the aircraft;

requesting, by the customer, from the electronic interface, a term sheet for the selected lease type and identified aircraft;

matching the customer provided information with the aircraft information by applying predetermined search rules including:

a first rule wherein only aircraft selected as being available by the lessor are returned by a search, if the exact match is not available for a specified delivery date, matches in nearest available months are displayed;

a second rule wherein for each aircraft viewable by the customer, at least one of a country and region may be identified into which that aircraft may not be leased;

a third rule wherein for each aircraft, a tax based restriction may be specified, the tax based restriction includes a geographical region;

a fourth rule wherein aircraft engines are retrieved based on a minimum engine thrust amount; and a fifth rule wherein aircraft are retrieved based on an aircraft weight;

displaying search results including each aircraft matching the customer provided information;

selecting by the customer an aircraft from the displayed search results;

modifying by the lessor the customer provided information for generating the term sheet;

generating the term sheet using the modified customer provided information and the customer selected aircraft, the term sheet including terms and conditions proposed by the lessor to the customer for leasing the customer selected aircraft to the customer by the lessor;

posting the generated term sheet such that the customer and the lessor can view the term sheet and document data, document data is information relating to the generation of the term sheet including historical drafts of the terms sheet, each author of the historical drafts, and modification dates; and tracking tasks to be performed, dates for performance, and parties responsible for performing the tasks as set forth in terms and conditions of the generated term sheet including at least one of inspecting the customer selected aircraft, signing the generated term sheet, and meeting regarding the lease transaction.

31. A method according to claim 30 wherein said lease transaction type comprises at least one of a lease extension, a lease, and a purchase lease back agreement.

32. A method according to claim 31 wherein for a lease extension, said method comprises the step of identifying the lease desired to be extended.

33. A method according to claim 30 wherein identifying information including criteria of the aircraft desired to be subject to the lease comprises the step of identifying the desired aircraft type and the criteria to be satisfied by the desired aircraft.

34. Apparatus for facilitating a lease transaction involving an aircraft between a lessor and a customer comprising:

means for storing information relating to a plurality of aircraft for lease including specifications for each aircraft and, if the aircraft is currently being leased, the terms of the lease;

means for prompting the customer to select a type of lease transaction for a specific type of aircraft to be leased;

means for prompting the customer to provide information regarding aircraft to be subject to the lease transaction, the customer provided information including criteria of the aircraft and additional lease requirements including an aircraft type, an aircraft series, and an amount of engine thrust desired from the aircraft;

means for prompting the customer to request generation of a term sheet for the lease transaction;

means for matching the customer provided information with the aircraft information by applying predetermined search rules including:

a first rule wherein only aircraft selected as being available by the lessor are returned by a search, if the exact match is not available for a specified delivery date, matches in nearest available months are displayed;

a second rule wherein for each aircraft viewable by the customer, at least one of a country and region may be identified into which that aircraft may not be leased;

a third rule wherein for each aircraft, a tax based restriction may be specified, the tax based restriction includes a geographical region;

a fourth rule wherein aircraft engines are retrieved based on a minimum engine thrust amount; and a fifth rule wherein aircraft are retrieved based on an aircraft weight;

means for displaying search results including each aircraft matching the customer provided information;

means for selecting by the customer an aircraft from the displayed search results;

means for modifying by the lessor the customer provided information for generating the term sheet;

means for generating the term sheet using the modified customer provided information and the customer selected aircraft, the term sheet including terms and conditions proposed by the lessor to the customer for leasing the customer selected aircraft to the customer by the lessor;

means for posting the generated term sheet such that the customer and the lessor can view the term sheet and document data, document, data is information relating to the generation of the term sheet including historical drafts of the terms sheet, each author of the historical drafts, and modification dates; and means for tracking tasks to be performed, dates for performance, and parties responsible for performing the tasks as set forth in terms and conditions of the generated term sheet including at least one of inspecting the customer selected aircraft, signing the generated term sheet, and meeting regarding the lease transaction.

35. Apparatus according to claim 34 wherein said means prompting a customer to select a type of lease transaction comprises means for displaying a computer generated screen listing a plurality of lease transaction type selections.

36. Apparatus according to claim 35 wherein said lease transaction type selections comprise at least one of a lease extension, a lease, and a purchase lease back agreement.

37. Apparatus according to claim 36 wherein for a lease extension, said means for prompting a customer to provide information regarding aircraft to be subject to the lease transaction displays information related to at least one lease to the customer.

38. Apparatus according to claim 34 wherein said means for prompting the customer to provide information regarding aircraft to be subject to the lease transaction comprises means for displaying a computer generated screen listing the aircraft criteria and delivery requirements.

39. Apparatus according to claim 34 further comprising means for searching a database to identify aircraft which match the aircraft criteria supplied by the customer in response to prompting the customer to provide information regarding the aircraft to be subject to the lease transaction, and means for displaying to the customer at least some information relating to at least some of the aircraft identified from the database search.

40. Apparatus according to claim 39 further comprising means for generating the term sheet using the customer provided information.

41. A system for facilitating a lease transaction for aircraft between a lessor and a customer, said system comprising:
a database comprising information relating to a plurality of aircrafts for lease including specifications for each aircraft and, if the aircraft is currently being leased, the terms of the lease; and
a server configured to:
prompt the customer to select a type of lease transaction for a specific type of aircraft to be leased;
prompt the customer to provide information regarding aircraft desired to be subject to the lease transaction, the customer provided information includes criteria of the aircraft and additional lease requirements including an aircraft type, an aircraft series, and an amount of engine thrust desired from the aircraft;
prompt the customer to request generation of a term sheet for the lease transaction;
match, based on a set of rules, the customer provided information with the aircraft information, the set of rules including:
a first rule wherein only aircraft selected as being available by the lessor are returned by a search, if the exact match is not available for a specified delivery date, matches in nearest available months are displayed;
a second rule wherein for each aircraft viewable by the customer, at least one of a country and region may be identified into which that aircraft may not be leased;
a third rule wherein for each aircraft, a tax based restriction may be specified, the tax based restriction includes a geographical region;
a fourth rule wherein aircraft engines are retrieved based on a minimum engine thrust amount; and
a fifth rule wherein aircraft are retrieved based on an aircraft weight;
display search results including each aircraft matching the customer provided information;
prompt the customer to select an aircraft from the displayed search results;
enable the lessor to modify the customer provided information for generating the term sheet;
generate the term sheet using the modified customer provided information and the customer selected aircraft, the term sheet including terms and conditions proposed by the lessor to the customer for leasing the customer selected aircraft to the customer by the lessor;
post the generated term sheet such that the customer and the lessor can view the term sheet and document data, document data is information relating to the generation of the term sheet including historical drafts of the term sheet, each author of the historical drafts, and modification dates; and
track tasks to be performed, dates for performance, and parties responsible for performing the tasks as set forth in terms and conditions of the generated term sheet including at least one of inspecting the customer selected aircraft, signing the generated term sheet, and meeting regarding the lease transaction.

42. A system according to claim 41 wherein to prompt a customer to select a type of lease transaction, said server causes to be displayed on a customer computer a computer generated screen listing a plurality of lease transaction type selections.

43. A system according to claim 42 wherein said lease transaction type selections comprise at least one of a lease extension, a lease, and a purchase lease back agreement.

44. A system according to claim 43 wherein for a lease extension, to prompt the customer to provide information regarding aircraft to be subject to the lease transaction, said server causes to be displayed on a customer computer information related to at least one lease to the customer.

45. A system according to claim 41 wherein to prompt the customer to provide information regarding aircraft to be subject to the lease transaction, said server causes to be displayed on a customer computer a display listing the aircraft criteria and delivery requirements.

46. A system according to claim 41 wherein said server is further configured to search said database to identify aircraft which match the aircraft criteria supplied by the customer, and to cause to be displayed on a customer computer at least some information relating to at least some of the aircraft identified from the database search.

47. A system for facilitating a lease transaction for an aircraft engine between a lessor and a customer, said system comprising:
a database comprising information for aircraft engines for lease including specifications for each aircraft engine and, if the aircraft engine is currently being leased, the terms of the lease; and
a server configured to:
prompt the customer to select a type of lease transaction for a specific type of aircraft engine to be leased,
prompt the customer to provide information regarding an aircraft engine desired to be subject to the lease transaction wherein the customer provided information includes criteria of the aircraft engine and additional lease requirements including an engine type, an engine series, and an amount of engine thrust desired from the engine,
prompt the customer to request generation of a term sheet for the lease transaction,
match the customer provided information with the aircraft engine information stored within the database by applying predetermined search rules including:
a first rule wherein only aircraft engines selected as being available by the lessor are returned by a search, if the exact match is not available for a specified delivery date, matches in nearest available months are displayed;
a second rule wherein for each aircraft engine viewable by the customer, at least one of a country and region may be identified into which that aircraft engine may not be leased;
a third rule wherein for each aircraft engine, a tax based restriction may be specified, the tax based restriction includes a geographical region;
a fourth rule wherein aircraft engines are retrieved based on a minimum engine thrust amount; and
a fifth rule wherein aircraft engines are retrieved based on an aircraft engine weight,
display search results including each aircraft engine matching the customer provided information,
prompt the customer to select an aircraft engine from the displayed search results,
enable the lessor to modify the customer provided information to generate the term sheet, generate the term sheet using the modified customer provided information and the customer selected aircraft engine, the term sheet including terms and conditions proposed by the lessor to the customer for leasing the customer selected aircraft engine to the customer by the lessor, post the generated term sheet such that the customer and the lessor can view the term sheet and document data including historical drafts of the term sheet, each author of the historical drafts, and modification dates, and track tasks to be performed, dates for performance, and parties responsible for performing the tasks as set forth in terms and conditions of the generated term sheet including at least one of inspecting the customer selected aircraft, signing the generated term sheet, and meeting regarding the lease transaction.

48. A system according to claim 47 wherein to prompt a customer to select a type of lease transaction, said server causes to be displayed on a customer computer a display listing a plurality of lease transaction type selections.

49. A system according to claim 48 wherein said lease transaction type selections comprise at least one of a lease extension, a lease, and a purchase lease back agreement.

50. A system according to claim 49 wherein for a lease extension, to prompt the customer to provide information regarding an aircraft engine to be subject to the lease transaction, said server causes to be displayed on a customer computer information related to at least one lease to the customer.

51. A system according to claim 47 wherein to prompt the customer to provide information regarding an aircraft engine to be subject to the lease transaction, said server causes to be displayed on a customer computer a computer generated screen listing the aircraft engine criteria and delivery requirements.

52. A system according to claim 47 wherein said server is further configured to search said database to identify aircraft engines which match the aircraft engine criteria supplied by the customer, and to cause to be displayed on a customer computer at least some information relating to at least some of the aircraft engines identified from the database search.

53. A system according to claim 52 wherein said server is configured to cause to be displayed on a customer computer a prompt to select at least one of the identified aircraft engines.

54. A computer-readable medium for facilitating a lease transaction involving an aircraft between a lessor and a customer, the computer-readable medium comprising:

a record of customer submitted availability queries, the customer submitted availability queries include criteria of aircraft to be leased and additional lease requirements;

a plurality of rules for matching aircraft information to the customer submitted availability queries, the aircraft information including specifications for each aircraft, and if the aircraft is currently being leased, the terms of the lease, the plurality of rules including:

a first rule wherein only aircraft selected as being available by the lessor are returned by a search, if the exact match is not available for a specified delivery date, matches in nearest available months are displayed;

a second rule wherein for each aircraft viewable by the customer, at least one of a country and region may be identified into which that aircraft may not be leased;

a third rule wherein for each aircraft, a tax based restriction may be specified, the tax based restriction includes a geographical region;

a fourth rule wherein aircraft engines are retrieved based on a minimum engine thrust amount; and a fifth rule wherein aircraft are retrieved based on an aircraft weight;

a first record of results from applying the matching rules to the customer submitted availability queries;

a record of an aircraft selected by the customer from the first record of results;

a second record of results from information entered by the lessor to modify the customer submitted availability queries;

a record of a document generated from the modified customer submitted availability queries and the record of an aircraft selected by the customer including historical drafts of the document, each author of the historical drafts, and modification dates; and a record of tasks to be performed, dates for performance, and parties responsible for performing the tasks as set forth in terms and conditions of the generated document including at least one of inspecting the customer selected aircraft, signing the generated document, and meeting regarding the lease transaction.

55. A computer-readable medium according to claim 54 wherein said availability query record comprises a query number and a model.

56. A computer-readable medium according to claim 54 further comprising a record of required delivery dates comprising a query number, a delivery year, a delivery month, and a quantity.

57. A computer-readable medium according to claim 54 wherein said first record of results comprises a result number, a query number, and a term sheet request.

58. A computer-readable medium according to claim 54 further comprising a record of availability.

* * * * *